(12) United States Patent
Rathinasamy et al.

(10) Patent No.: US 11,599,174 B2
(45) Date of Patent: Mar. 7, 2023

(54) HIGH AVAILABILITY COMBINED DATA/POWER PROVISIONING SYSTEM

(71) Applicant: Dell Products L.P., Round Rock, TX (US)

(72) Inventors: Shree Rathinasamy, Round Rock, TX (US); Neal Beard, Austin, TX (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/381,542

(22) Filed: Jul. 21, 2021

(65) Prior Publication Data

US 2023/0024116 A1 Jan. 26, 2023

(51) Int. Cl.
| | |
|---|---|
| *G06F 1/26* | (2006.01) |
| *H04L 12/10* | (2006.01) |
| *G06F 1/18* | (2006.01) |
| *G06F 11/20* | (2006.01) |
| *G06F 1/30* | (2006.01) |
| *G06F 1/28* | (2006.01) |

(52) U.S. Cl.
CPC .............. *G06F 1/266* (2013.01); *G06F 1/181* (2013.01); *G06F 1/189* (2013.01); *H04L 12/10* (2013.01); *G06F 1/263* (2013.01); *G06F 1/28* (2013.01); *G06F 1/30* (2013.01); *G06F 11/2015* (2013.01)

(58) Field of Classification Search
CPC . G06F 1/266; G06F 1/30; G06F 1/263; G06F 1/28; G06F 11/2015; G06F 1/189; G06F 1/181; H04L 12/10
USPC ............................................ 713/300; 714/14
See application file for complete search history.

(56) References Cited

U.S. PATENT DOCUMENTS

| | | | |
|---|---|---|---|
| 8,595,550 B1 * | 11/2013 | Heath | H04L 12/10 714/14 |
| 11,086,373 B2 * | 8/2021 | Frick | G06F 1/263 |
| 2008/0100141 A1 * | 5/2008 | Lee | H02J 1/102 307/43 |

(Continued)

OTHER PUBLICATIONS

Darwin Fernandez, "Designing Dual-Input PoE Systems for Power Redundancy, Hitless Failover, and Power Sharing," (Transcript), Texas Instruments, TI training & videos, Apr. 16, 2018, 43 pages, retrieved from https://training.ti.com/designing-dual-input-poe-pd-systems-power-redundancy-smooth-transition-and-power-sharing.

*Primary Examiner* — Ji H Bae
(74) *Attorney, Agent, or Firm* — Joseph Mencher

(57) ABSTRACT

A combined data/power coupling device includes a chassis having first and second powering device connectors and a powered device connector each coupled to a data/power coupling subsystem. The data/power coupling subsystem configures each of the first and second powering device connectors to receive power from at least one powering device, configures the first powering device connector to receive data from the at least one powering device, and provides data and power received via the first powering device connector to a powered device via the powered device connector. When the data/power coupling subsystem determines that data and power are not available via the first powering device connector, it configures the second powering device connector to receive data from the at least one powering device, and provides data and power received via the second powering device connector to the powered device via the powered device connector.

20 Claims, 20 Drawing Sheets

(56) References Cited

U.S. PATENT DOCUMENTS

| | | | |
|---|---|---|---|
| 2009/0073957 A1* | 3/2009 | Newland | H04L 12/10 370/352 |
| 2015/0019884 A1* | 1/2015 | Huff | H04L 12/10 713/300 |
| 2015/0205336 A1* | 7/2015 | Walker | H04L 12/10 713/340 |
| 2019/0229934 A1* | 7/2019 | Zhuang | G06F 1/266 |
| 2019/0253268 A1* | 8/2019 | Fu | H04L 12/40045 |

* cited by examiner

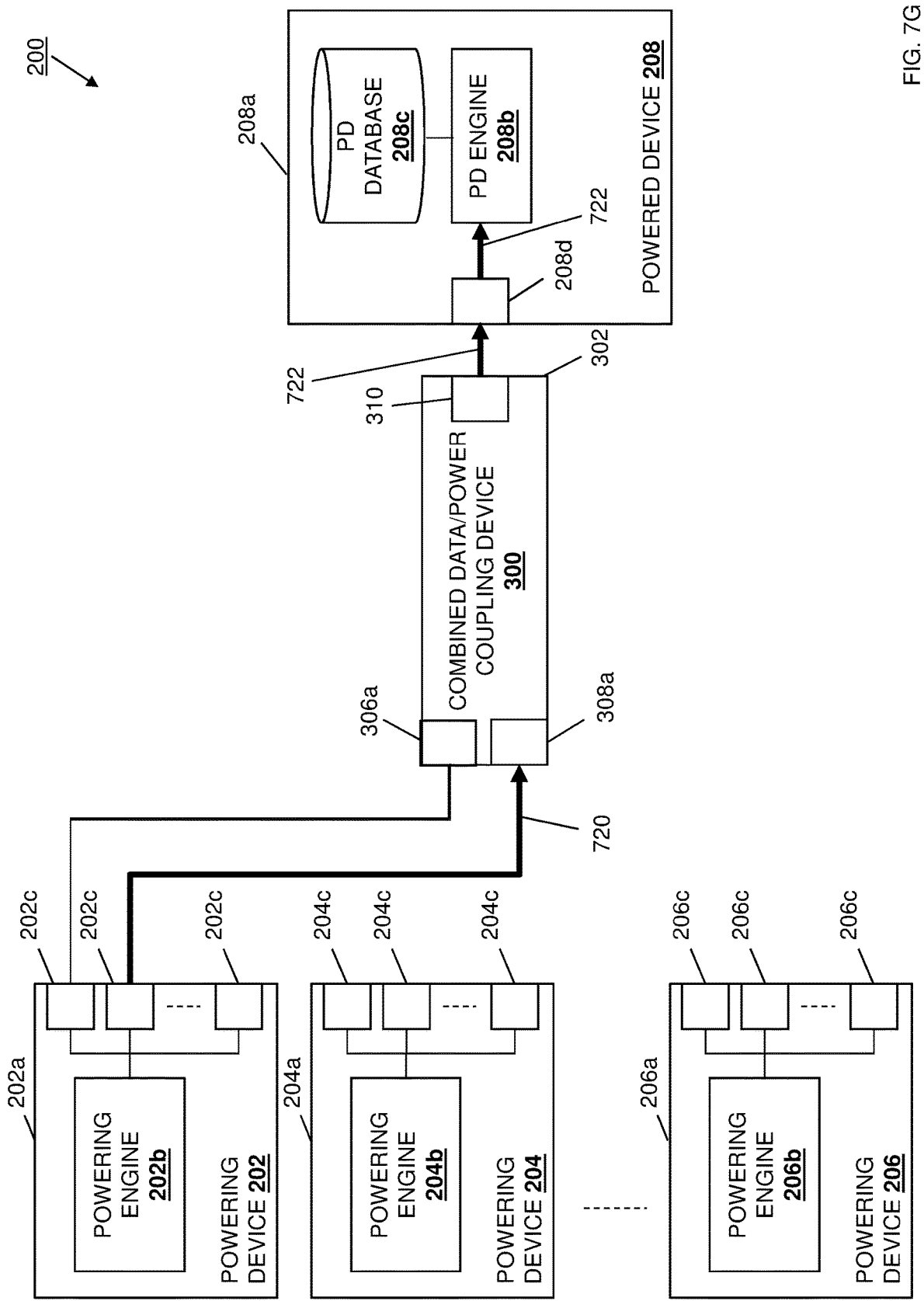

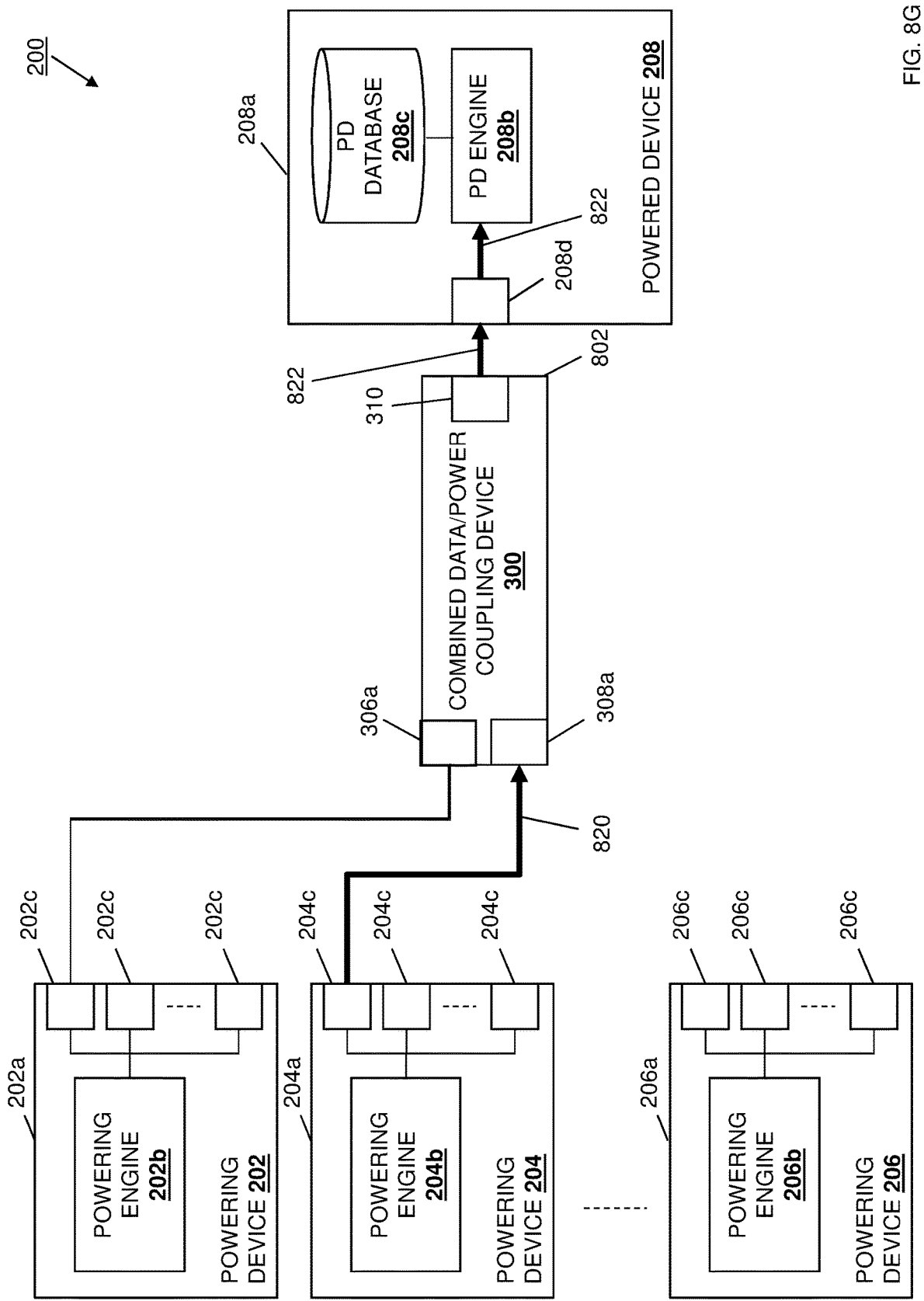

HIGH AVAILABILITY COMBINED DATA/POWER PROVISIONING SYSTEM

BACKGROUND

The present disclosure relates generally to information handling systems, and more particularly to providing combined data and power to an information handling system with high availability.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, may be configured to provide both data and power over the same cable to a computing device connected to any one of their ports. For example, Power over Ethernet (PoE) "powering" devices are configured to transmit both data and power via a port, over a cable connected to that port, and to a PoE "powered" computing device connected to that cable. However, because conventional PoE powering devices transmit data and power over a single port and cable to any particular PoE powered device, those PoE powered devices may become unavailable when the PoE powering device, its port, and/or the cable that connects it to that port experience issues. For example, the cable may become unplugged or damaged, the port may "go down" due to misconfiguration, the PoE powering device may lose power or be brought down for maintenance, the PoE powering device may stop powering the port when power resources are relatively low and the port has relatively low priority, and/or due to other issues known in the art. Many PoE powered devices are used for real-time data operations (e.g., PoE cameras, PoE phones, PoE wireless access points, PoE clocks, etc.), and due to the nature of conventional networks and the distances between data sources and data collection points (as well as vulnerabilities in-between them), the loss of such real-time data (and historical data) is often unrecoverable. As such, PoE systems may not be utilized with computing devices in networks that require 100% uptime for their PoE powered devices.

Accordingly, it would be desirable to provide a high availability combined data/power provisioning system that addresses the issues discussed above.

SUMMARY

According to one embodiment, an Information Handling System (IHS) includes at least one powering device; a powered device; and a combined data/power coupling device including a first powering device connector and a second powering device connector that are each coupled to the at least one powering device, and a powered device connector coupled to the powered device, wherein the combined data/power coupling device is configured to: configure each of the first powering device connector and the second powering device connector to receive power from the at least one powering device; configure the first powering device connector to receive data from the at least one powering device; provide data and power received from the at least one powering device via the first powering device connector to the powered device via the powered device connector; determine that data and power are not available via the first powering device connector; configure the second powering device connector to receive data from the at least one powering device; and provide data and power received from the at least one powering device via the second powering device connector to the powered device via the powered device connector.

BRIEF DESCRIPTION OF THE DRAWINGS

FIG. 7G is a schematic view illustrating an embodiment of the high availability combined data/power coupling device in the networked system of FIG. 5 operating during the method of FIG. 4.

FIG. 8G is a schematic view illustrating an embodiment of the high availability combined data/power coupling device in the networked system of FIG. 6 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
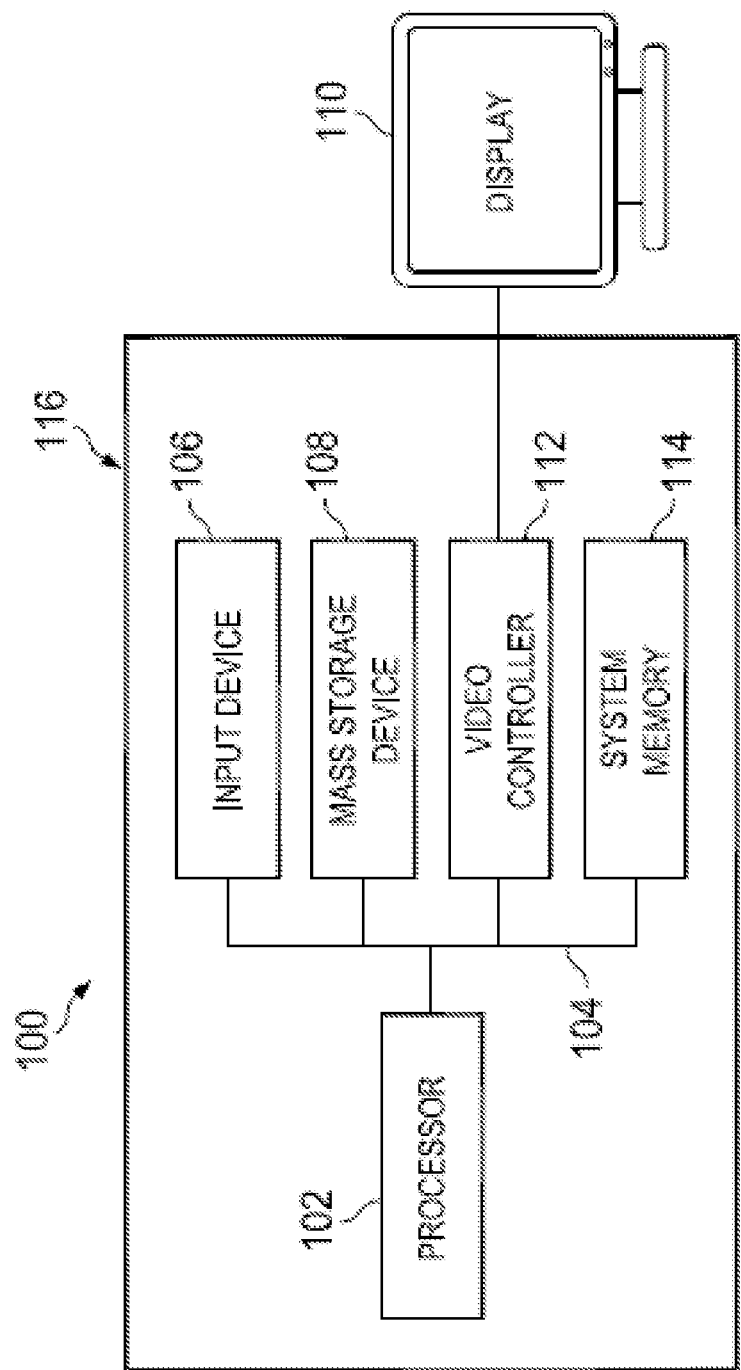
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
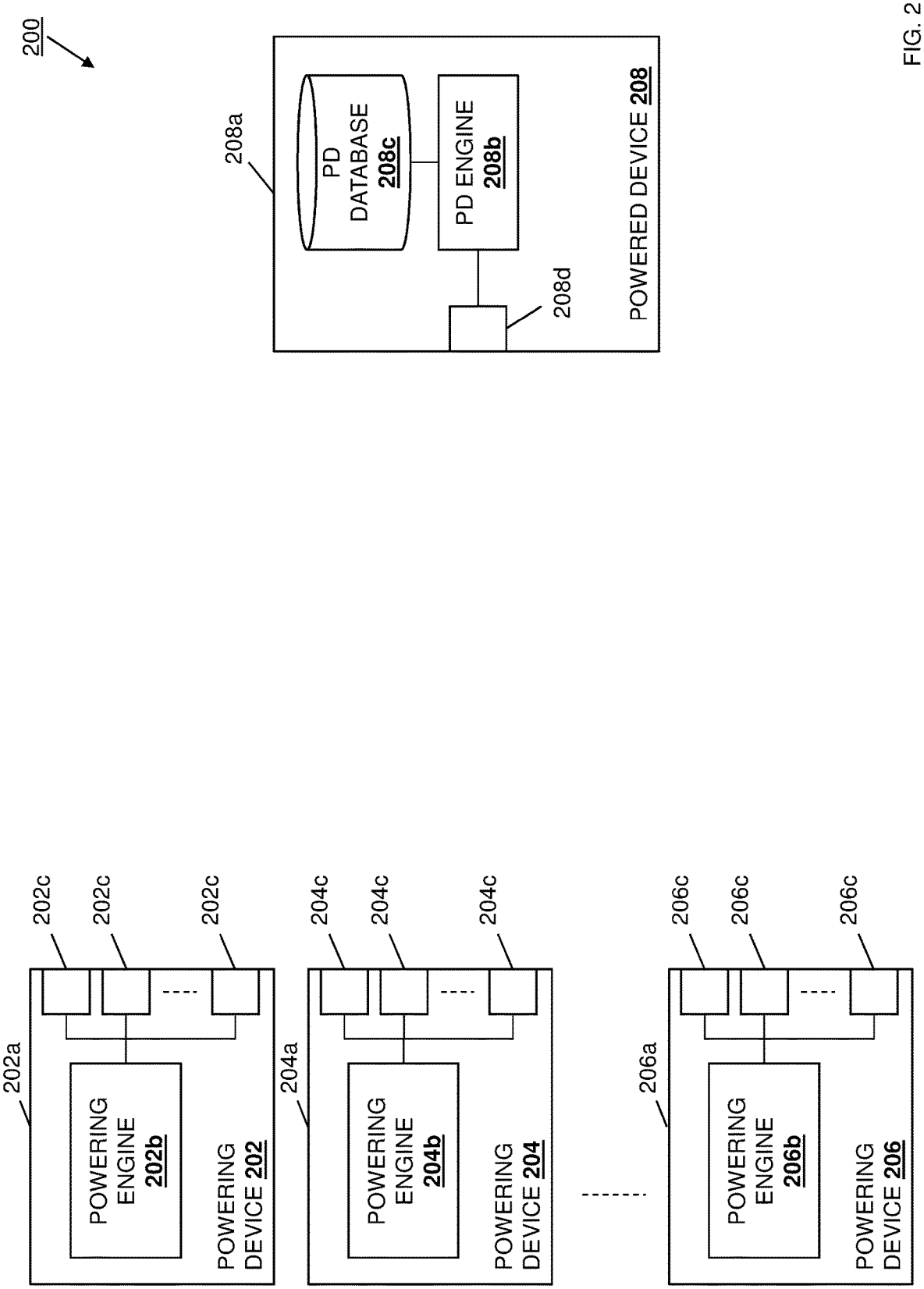
FIG. 2 is a schematic view illustrating an embodiment of a networked system that may utilize the high availability combined data/power provisioning system of the present disclosure.

Referring now to FIG. 2, an embodiment of a networked system 200 is illustrated that may utilize the high availability combined data/power provisioning system of the present disclosure. In the illustrated embodiment, the networked system 200 includes a plurality of powering devices 202, 204, and up to 206. In an embodiment, any or all of the powering devices 202-206 may be provided by the IHS 100 discussed above with reference to FIG. 1, and/or may include some or all of the components of the IHS 100, and in specific examples are provided by Power over Ethernet (PoE)-capable switch devices. However, while illustrated and discussed as being provided by PoE capable switch devices, one of skill in the art in possession of the present disclosure will recognize that powering devices provided in the networked system 200 may include any devices that may be configured to operate similarly as discussed below to provide power and data via a port and cable to a powered device.

In the embodiments provided herein, each powering device 202-206 includes a chassis that houses a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a powering engine that is configured to perform the functionality of the powering engines and/or powering devices discussed below. Furthermore, each powering device 202-206 also includes a plurality of ports that are coupled to its powering engine. As such, the powering device 202 includes a chassis 202a that houses a powering engine 202b coupled to ports 202c, the powering device 204 includes a chassis 204a that houses a powering engine 204b coupled to ports 204c, and the powering device 206 includes a chassis 206a that houses a powering engine 206b coupled to ports 206c. However, while specific powering devices 202-206 are illustrated and described, one of skill in the art in possession of the present disclosure will recognize that powering devices (switch devices and/or other devices operating according to the teachings of the present disclosure in a manner similar to that described below for the powering devices 202-206 discussed below) may include a variety of components and/or component configurations for providing conventional powering device functionality (e.g., switching functionality), as well as the functionality discussed below, while remaining within the scope of the present disclosure as well.

In the illustrated embodiment, the networked system 200 also includes a powered device 208 that may be coupled to one or more of the powering devices 202-206 as discussed in further detail below. In an embodiment, the powered device 208 may be provided by the IHS 100 discussed above with reference to FIG. 1, and/or may include some or all of the components of the IHS 100, and in specific examples are provided by Power over Ethernet (PoE)-capable cameras, phones, wireless access points, clocks, and/or other PoE powered devices known in the art. However, while illustrated and discussed as PoE capable powered devices, one of skill in the art in possession of the present disclosure will recognize that powered devices provided in the networked system 200 may include any devices that may be configured to operate similarly as discussed below to receive power and data via a port and cable from powering device(s).

In the embodiments provided herein, the powered device 208 includes a chassis 208a that houses house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Powered Device (PD) engine 208b that is configured to perform the functionality of the powered device engines and/or powered devices discussed below. Furthermore, the powered device 208 may also house a storage system (not illustrated, but which may include the storage 108 discussed above with reference to FIG. 1) that is coupled to the powered device engine 208b (e.g., via a coupling between the storage system and the processing system) and that includes a Powered Device (PD) database 208c that is configured to store any of the information (e.g., data tables such as the Media Access Control (MAC) tables discussed below) utilized by the powered device engine 208b discussed below. Furthermore, the powered device 208 may also include a port 208d that is coupled to the powered device engine 208b.

However, while a specific powered device 208 is illustrated and described, one of skill in the art in possession of the present disclosure will recognize that powered devices (and/or other devices operating according to the teachings of the present disclosure in a manner similar to that described below for the powered device 208 discussed below) may include a variety of components and/or component configurations for providing conventional powered device functionality, as well as the functionality discussed below, while remaining within the scope of the present disclosure as well. Furthermore, while a specific networked system 200 has been illustrated and described, one of skill in the art in possession of the present disclosure will recognize that the high availability combined data/power provisioning system of the present disclosure may include a variety of components and component configurations while remaining within the scope of the present disclosure as well.

Figure 3:
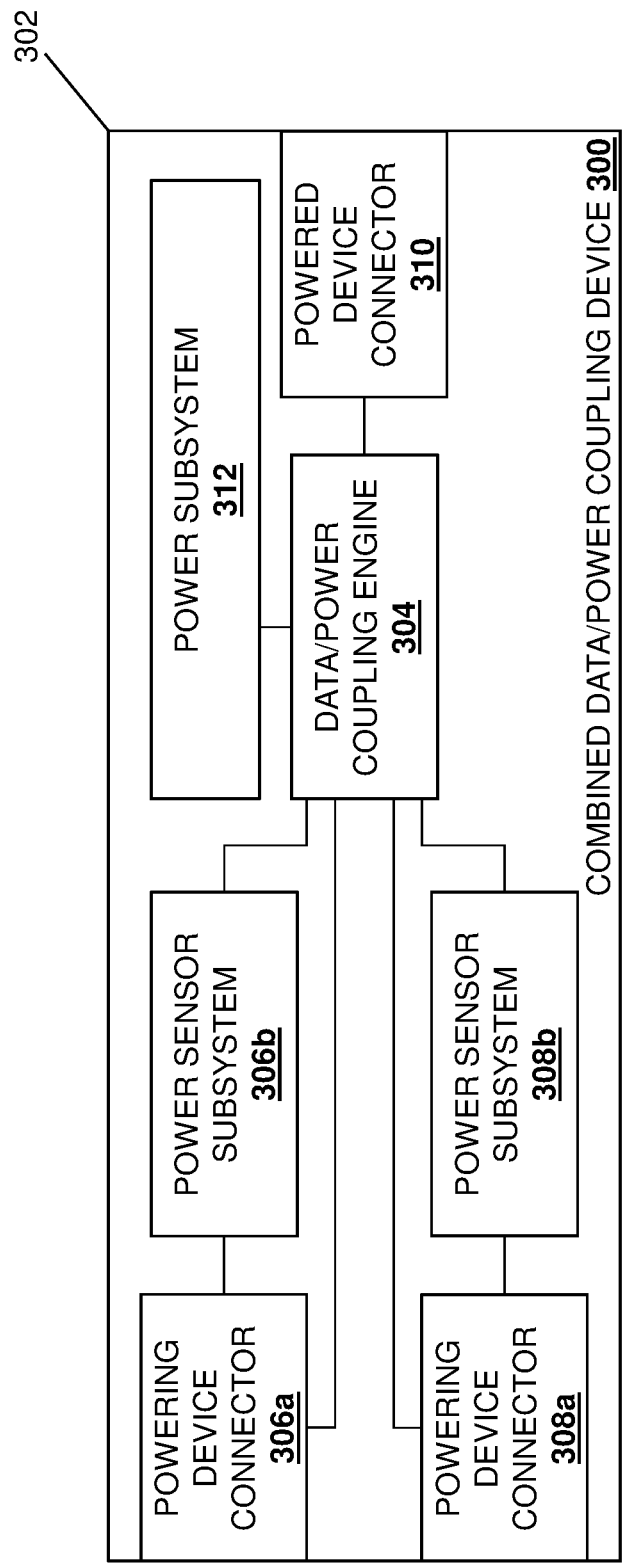
FIG. 3 is a schematic view illustrating an embodiment of a high availability combined data/power coupling device that may be utilized in the networked system of FIG. 2.

Referring now to FIG. 3, an embodiment of a combined data/power coupling device 300 is illustrated that may be provided to couple the powered device 208 discussed above with reference to FIG. 2 to one or more of the powering devices 202-206 discussed above with reference to FIG. 2. In an embodiment, the combined data/power coupling device 300 may be provided by the IHS 100 discussed above with reference to FIG. 1 and/or may include some or all of the components of the IHS 100. Furthermore, while illustrated and discussed as standalone combined data/power coupling device 300 in its own chassis, one of skill in the art in possession of the present disclosure will recognize that the functionality of the combined data/power coupling device 300 discussed below may be integrated into the powered device 208 while remaining within the scope of the present disclosure as well. In the illustrated embodiment, the combined data/power coupling device 300 includes a chassis 302 that houses the components of the combined data/power coupling device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data/power coupling engine 304 that is configured to perform the functionality of the data/power coupling engines and/or combined data/power coupling devices discussed below. In a specific example, the processing system that provides the data/power coupling engine 304 may be provided by an Ethernet System on Chip (SoC), although one of skill in the art in possession of the present disclosure will appreciate that other processing systems will fall within the scope of the present disclosure as well.

The chassis 302 may also include a plurality of powering device connectors 306a and 308a, and while only two powering device connectors are illustrated and described below, one of skill in the art in possession of the present disclosure will appreciate how additional powering device connectors may be included on the combined data/power coupling device 300 to provide high availability while remaining within the scope of the present disclosure as well. In some embodiments, the powering device connectors 306a and 308a may be provided by female connectors such as, for example, the female Ethernet connectors discussed below, although one of skill in the art in possession of the present disclosure will appreciate that female connectors utilizing other power/data connection technology will fall within the scope of the present disclosure as well. In other embodiments, the powering device connectors 306a and 308a may be provided by male connectors such as, for example, the male Ethernet connectors discussed below, although one of skill in the art in possession of the present disclosure will appreciate that male connectors utilizing other power/data connection technology will fall within the scope of the present disclosure as well. As illustrated, each of the powering device connectors 306a and 308a may be coupled to the data/power coupling engine 304 (e.g., via a coupling between the powering device connectors 306a and 308a and the processing system).

In the specific examples provided herein, a power sensor subsystem 306b is provided with the powering device connector 306a and is configured to detect when power is not available via the powering device connector 306a, and a power sensor subsystem 308b is provided with the powering device connector 308a and is configured to detect when power is not available via the powering device connector 308a. As illustrated, the power sensor subsystem 306b is coupled to the powering device connector 306a and the data/power coupling engine 304 (e.g., via a coupling between the power sensor subsystem 306b and the processing system), and the power sensor subsystem 308b is coupled to the powering device connector 308a and the data/power coupling engine 304 (e.g., via a coupling between the power sensor subsystem 308*b* and the processing system). While not described herein in detail, one of skill in the art in possession of the present disclosure will recognize how a wide variety or power sensor technology may be used to implement the power sensor subsystems 306*b* and 308*b* and, in particular, provide for the unavailable power reporting to the data/power coupling engine 304 as discussed below.

The chassis 302 may also include a powered device connector 310 that is coupled the data/power coupling engine 304 (e.g., via a coupling between the powered device connector 310 and the processing system). In some embodiments, the powered device connector 310 may be provided by a female connector such as, for example, the female Ethernet connector discussed below, although one of skill in the art in possession of the present disclosure will appreciate that a female connector utilizing other power/data connection technology will fall within the scope of the present disclosure as well. In other embodiments, the powered device connector 310 may be provided by a male connector such as, for example, the male Ethernet connector discussed below, although one of skill in the art in possession of the present disclosure will appreciate that a male connector utilizing other power/data connection technology will fall within the scope of the present disclosure as well.

The chassis 302 may also house a power subsystem 312 that is coupled to the data/power coupling engine 304 (e.g., via a coupling between the power subsystem 312 and the processing system). In a specific example, the power subsystem 312 may be provided by one or more capacitors that are configured to ensure the provisioning of sufficient power for the combined data/power coupling device during the unavailable power/powering device connector switchover operations discussed below, although one of skill in the art in possession of the present disclosure will appreciate how the power subsystem 312 may be provided by a variety of other power technologies while remaining within the scope of the present disclosure as well. Furthermore, while a specific combined data/power coupling device 300 has been illustrated and described, one of skill in the art in possession of the present disclosure will recognize that the combined data/power coupling device (or other devices operating according to the teachings of the present disclosure in a manner similar to that described below for the combined data/power coupling device 300) may include a variety of components and/or component configurations for providing the functionality discussed below while remaining within the scope of the present disclosure.

Figure 4:
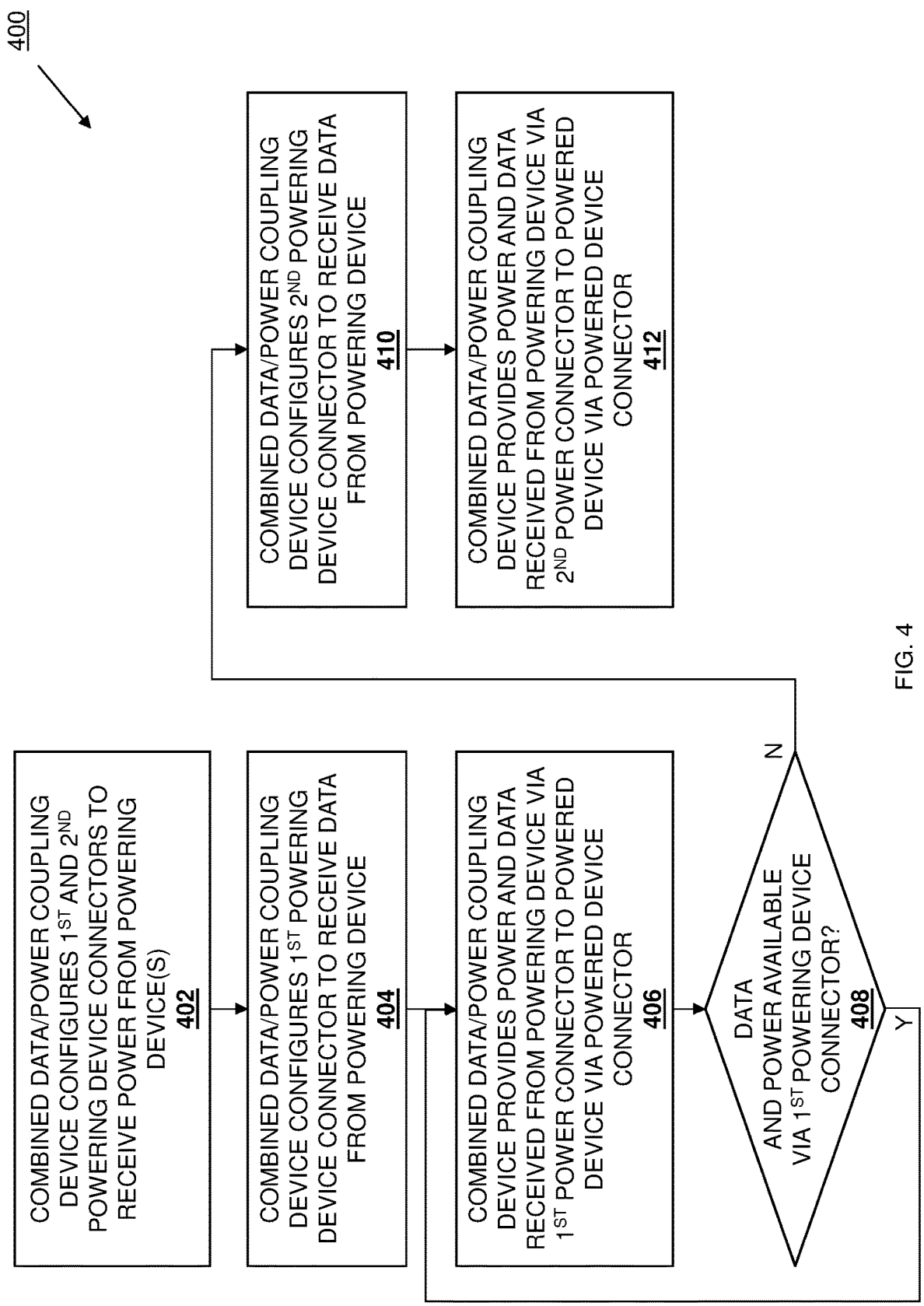
FIG. 4 is a flow chart illustrating an embodiment of a method for providing combined data/power to a powered device.

Referring now to FIG. 4, an embodiment of a method 400 for providing combined data/power to a powered device is illustrated. As discussed below, the systems and methods of the present disclosure provide data/power port-level or powering-device-level redundancy by connecting to multiple powering device ports (on the same powering device or different powering devices), providing data and power from a first of those powering device ports to a powered device port, and then performing an uninterrupted switchover to provide data and power from a second of those powering device ports to the powered device port in the event the power is not available from the first of those powering device ports. For example, the combined data/power coupling device of the present disclosure may include a chassis having first and second powering device connectors and a powered device connector each coupled to a data/power coupling subsystem. The data/power coupling subsystem configures each of the first and second powering device connectors to receive power from at least one powering device, configures the first powering device connector to receive data from the at least one powering device, and provides data and power received via the first powering device connector to a powered device via the powered device connector. When the data/power coupling subsystem determines that data and power are not available via the first powering device connector, it configures the second powering device connector to receive data from the at least one powering device, and provides data and power received via the second powering device connector to the powered device via the powered device connector. As such, if a cable becomes unplugged or damaged, a powering port "goes down" due to misconfiguration, a powering device loses power or is brought down for maintenance, a powering device stops powering a port when power resources are relatively low and the port has relatively low priority, the powered device will still receive data and power, thus preventing loss of real-time and historical data.

Figure 5:
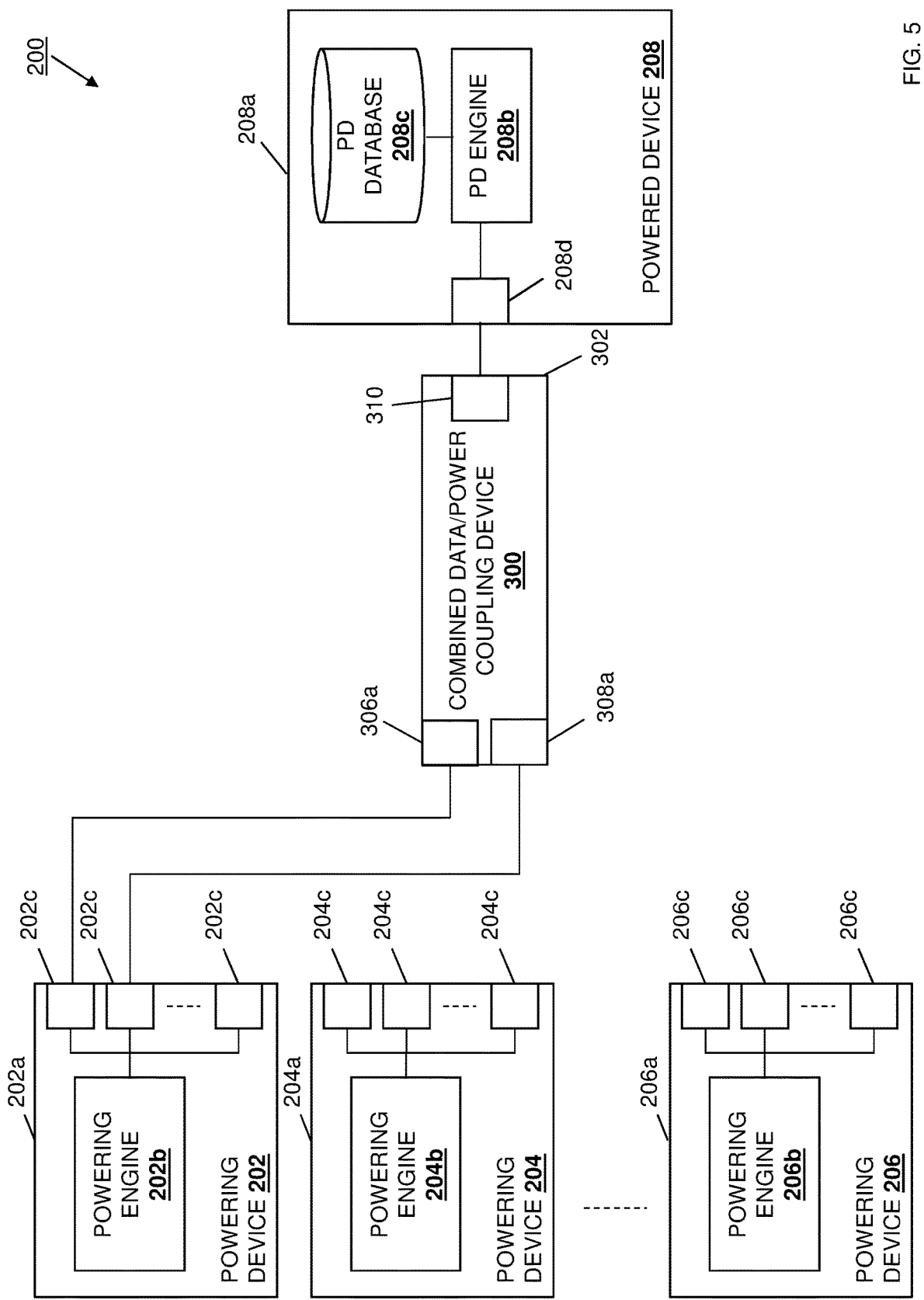
FIG. 5 is a schematic view illustrating an embodiment of the high availability combined data/power coupling device of FIG. 3 included in the networked system of FIG. 2.

With reference to FIG. 5, an embodiment is illustrated in which the combined data/power coupling device 300 is used to provide port-level data/power redundancy for the powered device 208 by coupling the powered device connector 310 on the combined data/power coupling device 300 to the port 208*d* on the powered device 208, coupling the powering device connector 306*a* on the combined data/power coupling device 300 to one of the ports 202*c* on the powering device 202, and coupling the powering device connector 308*a* on the combined data/power coupling device 300 to another of the ports 202*c* on the powering device 202. In specific examples in which the powering device connectors 306*a* and 306*b* are female connectors, each may be coupled to the respective ports 202*c* on the powering device 202 via a respective cable (e.g., respective Ethernet cables). Similarly, in specific examples in which the powered device connector 310 is a female connector, it may be coupled to the port 208*d* on the powered device 208 via a cable (e.g., an Ethernet cable).

In specific examples in which the powering device connectors 306*a* and 306*b* are male connectors, each may be directly coupled to the respective ports 202*c* on the powering device 202, and thus the configuration of the combined data/power coupling device 300 may provide the powering device connectors 306*a* and 306*b* spaced similarly as the ports 202*c* on the powering device 202 in order to allow the direct connection of the powering device connectors 306*a* and 306*b* to the respective ports 202*c* on the powering device 202. Similarly, in specific examples in which the powered device connector 310 is a male connector, it may be directly coupled to the port 208*d* on the powered device 208. As such, one of skill in the art in possession of the present disclosure will appreciate how female/male combinations of the powering device connectors 306*a*/306*b* and the powered device connector 310 (e.g., a male powered device connector 310 and female powering device connectors 306*a*/308*a*, male powering device connectors 306*a*/308*a* and a female powered device connector 310, etc.) may be provided while remaining within the scope of the present disclosure.

Furthermore, one of skill in the art in possession of the present disclosure will appreciate how some powering devices may include groups of ports that share the same physical layer (PHY) device (e.g., groups of 4 ports on the powering device may share the same PHY device). As such, in situations in which the combined data/power coupling device 300 is used to provide port-level data/power redundancy for the powered device 208, the coupling of the powering device connectors 306*a* and 308*a* to the same powering device may be configured to ensure that the powering device connectors 306a and 308a are connected to ports that utilize different PHY devices, which operates to ensure that the unavailability of a PHY device does not result in unavailability of each of the ports coupled to the combined data/power coupling device 300.

Figure 6:
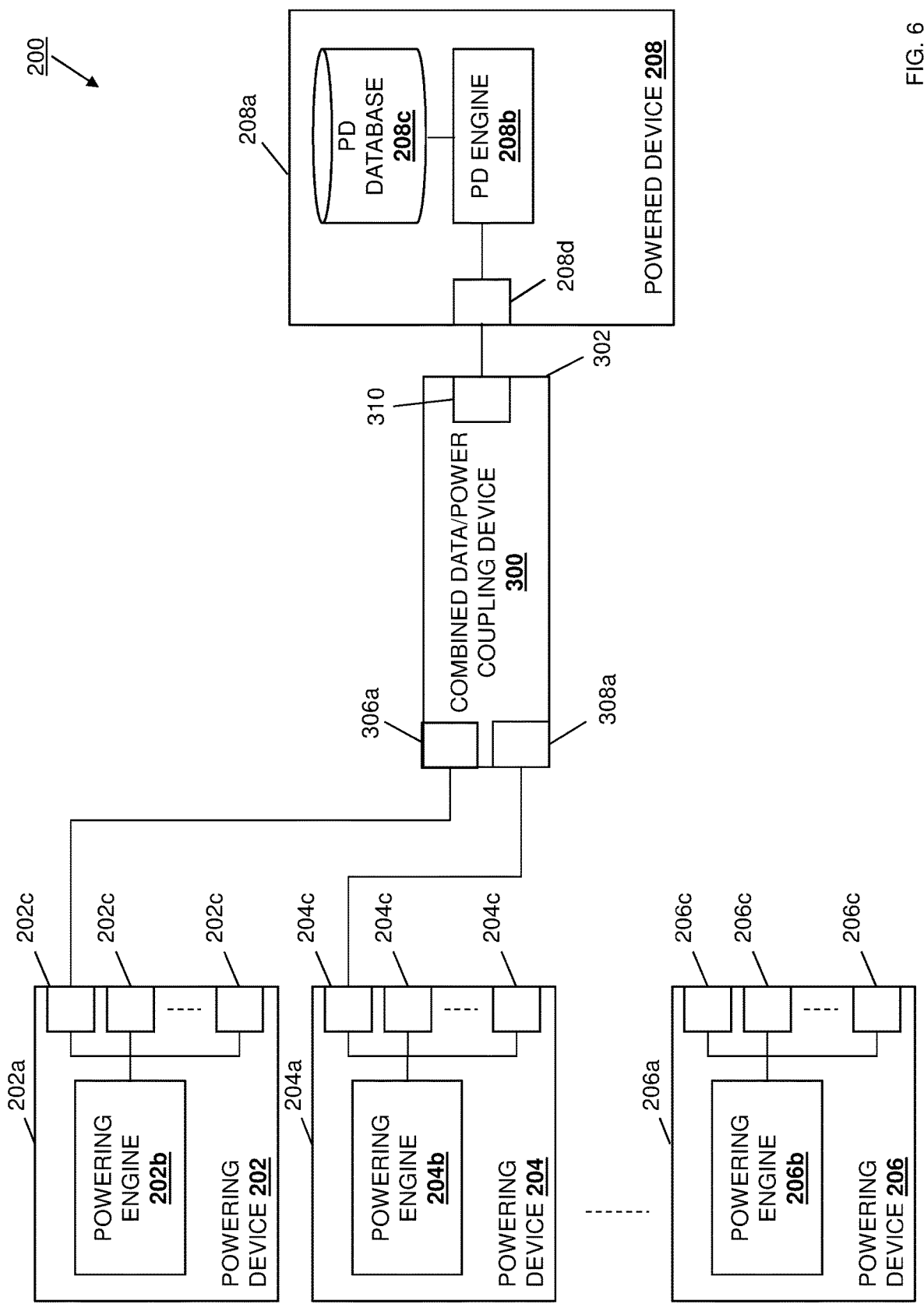
FIG. 6 is a schematic view illustrating an embodiment of the high availability combined data/power coupling device of FIG. 3 included in the networked system of FIG. 2.

With reference to FIG. 6, an embodiment is illustrated in which the combined data/power coupling device 300 is used to provide powering-device-level data/power redundancy for the powered device 208 by coupling the powered device connector 310 on the combined data/power coupling device 300 to the port 208d on the powered device 208, coupling the powering device connector 306a on the combined data/power coupling device 300 to one of the ports 202c on the powering device 202, and coupling the powering device connector 308a on the combined data/power coupling device 300 to one of the ports 204c on the powering device 204. In specific examples in which the powering device connectors 306a and 306b are female connectors, each may be coupled to the respective ports 202c and 204c on the respective powering devices 202 and 204 via a respective cable (e.g., respective Ethernet cables). Similarly, in specific examples in which the powered device connector 310 is a female connector, it may be coupled to the port 208d on the powered device 208 via a cable (e.g., an Ethernet cable).

In specific examples in which the powered device connector 310 is a male connector, it may be directly coupled to the port 208d on the powered device 208. As such, one of skill in the art in possession of the present disclosure will appreciate how female/male combinations of the powering device connectors 306a/306b and the powered device connector 310 (e.g., a male powered device connector 310 and female powering device connectors 306a/308a, etc.) may be provided while remaining within the scope of the present disclosure. However, while several examples of the coupling of the powered device 208 to one or more of the powering devices 202-206 has been illustrated and described, one of skill in the art in possession of the present disclosure will appreciate how the combined data/power coupling device may be used to couple the powered device 208 to any of a variety of combinations of the powering devices 202-206 and in any of a variety of configurations while remaining within the scope of the present disclosure as well.

Figure 7A:
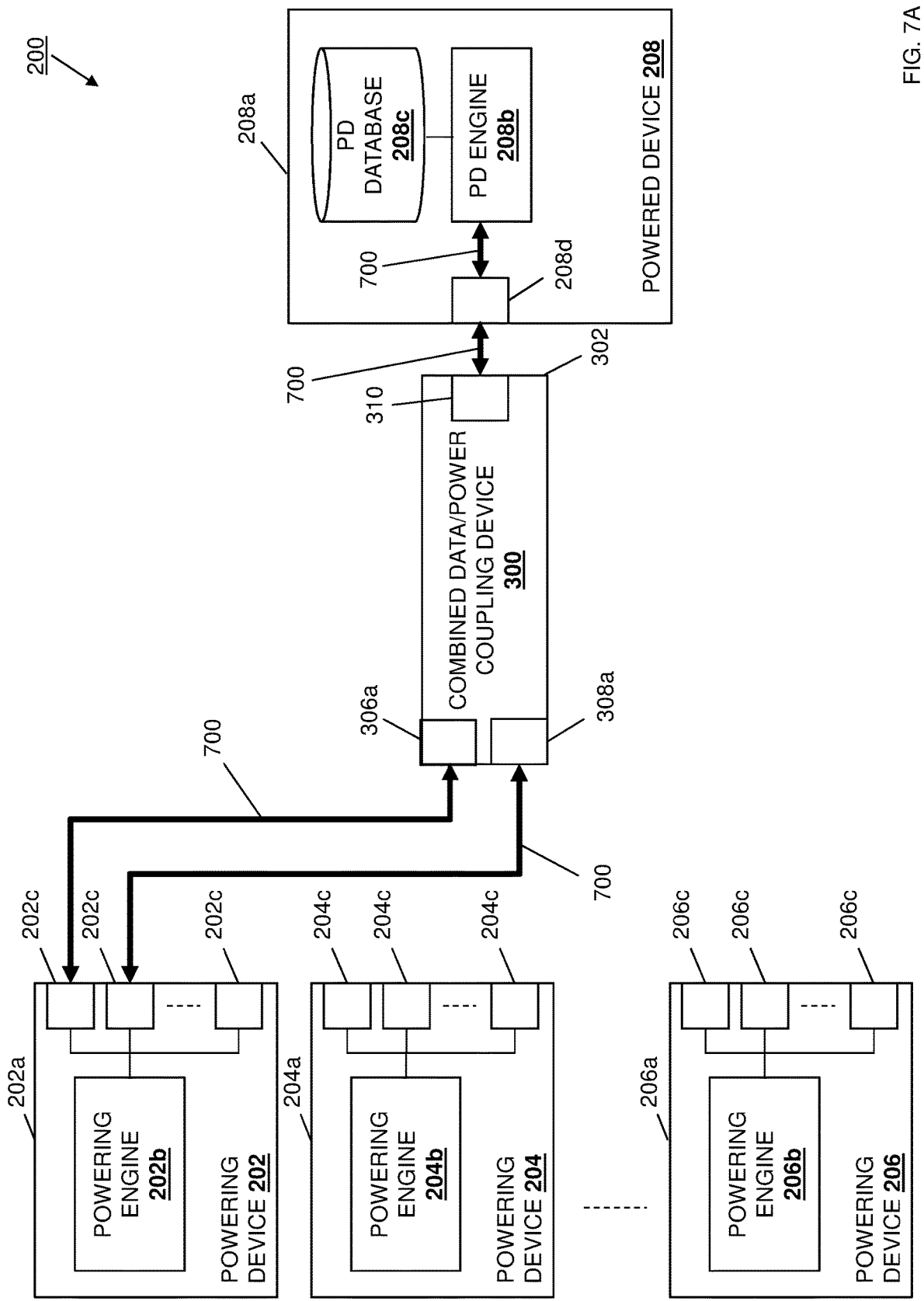
FIG. 7A is a schematic view illustrating an embodiment of the high availability combined data/power coupling device in the networked system of FIG. 5 operating during the method of FIG. 4.

The method 400 begins at block 402 where a combined data/power coupling device configures first and second powering device connectors to receive power from powering device(s). With reference to FIG. 7A, in an embodiment of block 402, the data/power coupling engine 304 in the combined data/power coupling device 300 may perform powering device connector power negotiation operations 700 that include communicating with the powered device engine 208d via the powered device connector 310 and the port 208d on the powered device 208 to which it is coupled, communicating with the powering engine 202b via the powering device connector 306a and the port 202c on the powering device 202 to which it is coupled, and communicating with the powering engine 202b via the powering device connector 308a and the port 202c on the powering device 202 to which it is coupled, in order to negotiate power amounts that the powering engine 202b will provide via its ports 202c to the powering device connectors 306a and 306b on the combined data/power coupling device 300.

In a specific example, the communications by the data/power coupling engine 304 in the combined data/power coupling device 300 with the powered device engine 208b in the powered device 208 and the powering engine 202b in the powering device 202 may include any of a variety of PoE communications that one of skill in the art in possession of the present disclosure would recognize as providing for the configuration of each of the powering device connectors 306a and 308a to receive power from the respective ports on the powering device 202. As such, the configuration of the powering device connectors 306a and 308b to receive power from the powering device 202 may be based on the power required by the powered device 208, a priority of the powered device 208, the power available from the powering device 202, and/or any other PoE power negotiations considerations that would be apparent to one of skill in the art in possession of the present disclosure. Furthermore, one of skill in the art in possession of the present disclosure will appreciate how the data/power coupling engine 304 may be configured to perform any PoE power negotiation operations for each of the powering device connectors 306a and 308b in a manner that is similar to PoE power negotiations operations that would be performed by the powered device 208 for the port 208d, and that any of a variety of information required from the powered device 208 to perform those PoE negotiations operations may be retrieved as part of the communications with the powered device 208. Furthermore, while a specific example of PoE power negotiations are described, one of skill in the art in possession of the present disclosure will appreciate how other combined data/power provisioning protocols may be utilized to negotiate power that will be provide by the powering device 202 to the powering device connectors 306a and 308a while remaining within the scope of the present disclosure as well.

As such, following block 402, the powering device 202 may be configured to provide power via its respective ports 202c to each of the powering device connectors 306a and 308a. However, as also discussed below, one of those powering device connectors (the powering device connector 308a in the example below) will not actually draw the power that is provided by the powering device 202 until power becomes unavailable via the other powering device connector (the powering device connector 306a in the example below). As such, following block 402, the power provided by the powering device 202 via the powering device connector 306a may be utilized to power the combined data/power coupling device 300. Furthermore, while the configuration of both of the powering device connectors 306a and 308a at block 402 to receive power (i.e., the power negotiation for both powering device connectors 306a and 308a with the powering device 202) is described as being performed at the beginning of the method 400, one of skill in the art in possession of the present disclosure will appreciate that at least a portion of block 402 may be performed at different times. For example, the configuration of the powering device connector 308a to receive power (i.e., the power negotiation for the powering device connector 308a with the powering device 202) later in the method 400 (e.g., following power being unavailable from the powering device connector 306a) while remaining within the scope of the present disclosure as well.

Figure 8A:
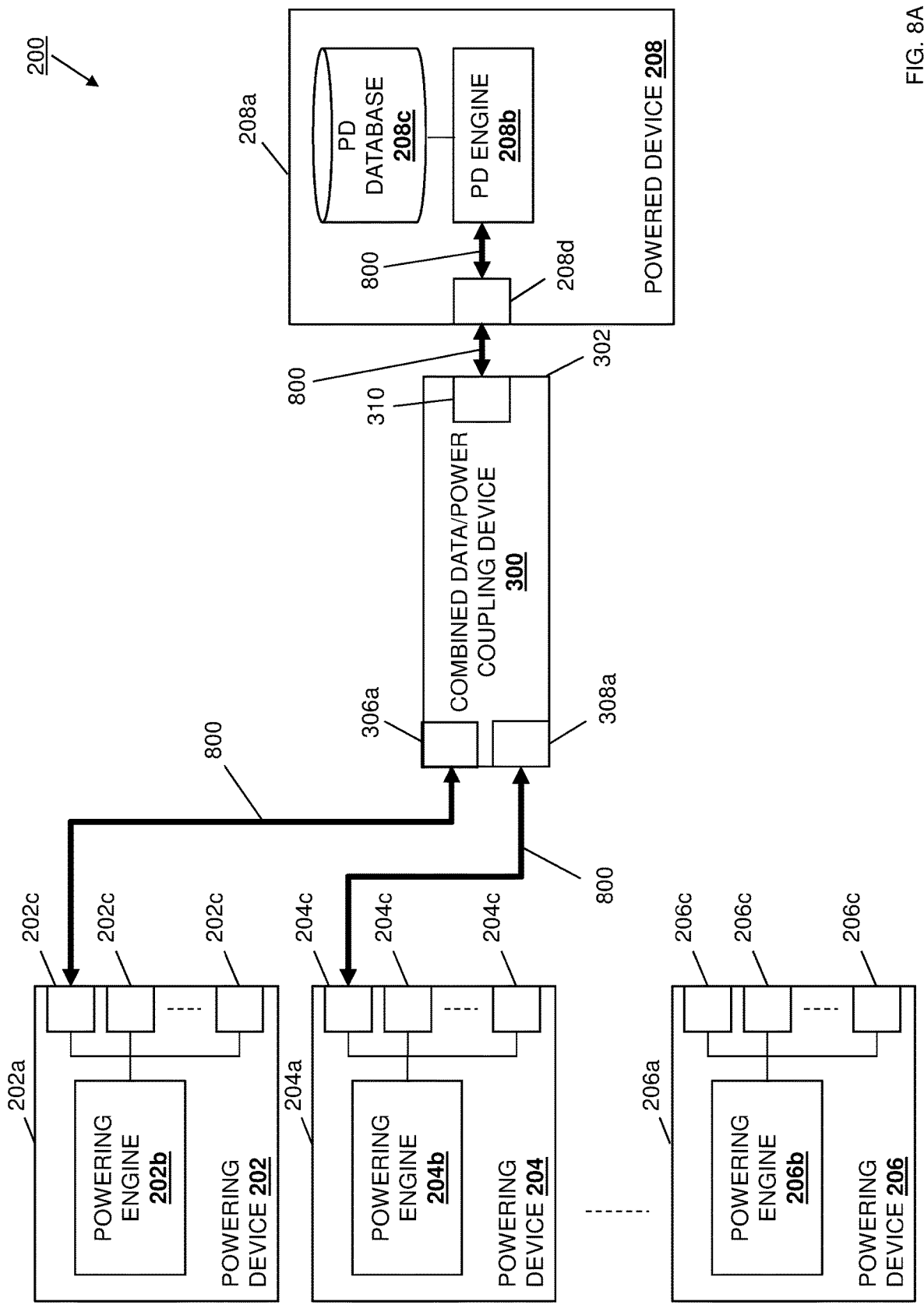
FIG. 8A is a schematic view illustrating an embodiment of the high availability combined data/power coupling device in the networked system of FIG. 6 operating during the method of FIG. 4.

With reference to FIG. 8A, in an embodiment of block 402, the data/power coupling engine 304 in the combined data/power coupling device 300 may perform powering device connector power negotiation operations 800 that include communicating with the powered device engine 208d via the powered device connector 310 and the port 208d on the powered device 208 to which it is coupled, communicating with the powering engine 202b via the powering device connector 306a and the port 202c on the powering device 202, and communicating with the powering engine 204b via the powering device connector 308a and the port 204c on the powering device 204, in order to negotiate a power amount that the powering engine 202b will provide via its port 202c to the powering device connector 306a on the combined data/power coupling device 300, and negotiate a power amount that the powering engine 204b will provide via its port 204c to the powering device connector 308a on the combined data/power coupling device 300.

In a specific example, the communications by the data/power coupling engine 304 in the combined data/power coupling device 300 with the powered device engine 208b in the powered device 208, the powering engine 202b in the powering device 202, and the powering engine 204b in the powering device 204 may include any of a variety of PoE communications that one of skill in the art in possession of the present disclosure would recognize as configuring each of the powering device connectors 306a and 308a to receive power from the port 202c on the powering device 202 and the port 204c on the powering device 204, respectively. As such, the configuration of the powering device connectors 306a and 308b to receive power from the powering devices 202 and 204, respectively, may be based on the power required by the powered device 208, a priority of the powered device 208, the power available from the powering device 202, the power available from the powering device 204, and/or any other PoE power negotiations considerations that would be apparent to one of skill in the art in possession of the present disclosure. Furthermore, one of skill in the art in possession of the present disclosure will appreciate how the data/power coupling engine 304 may be configured to perform any PoE power negotiation operations for each of the powering device connectors 306a and 308b in a manner that is similar to PoE power negotiations operations that would be performed by the powered device 208 for the port 208d, and that any of a variety of information required from the powered device 208 to perform those PoE negotiations operations may be retrieved as part of the communications with the powered device 208. Furthermore, while a specific example of PoE power negotiations are described, one of skill in the art in possession of the present disclosure will appreciate how other combined data/power provisioning protocols may be utilized to negotiate power for the powering device connectors 306a and 308a while remaining within the scope of the present disclosure as well.

As such, following block 402, the powering device 202 may be configured to provide power via its port 202c to the powering device connector 306a, and the powering device 204 may be configured to provide power via its port 204c to the powering device connector 308a. However, as also discussed below, one of those powering device connectors (the powering device connector 308a in the example below) will not actually draw the power that is provided by the powering device 204 until power becomes unavailable via the other powering device connector (the powering device connector 306a in the example below). As such, following block 402, the power provided by the powering device 202 via the powering device connector 306a may be utilized to power the combined data/power coupling device 300. Furthermore, while the configuration of both of the powering device connectors 306a and 308a at block 402 to receive power (i.e., the power negotiation for both powering device connectors 306a and 308a with the powering devices 202 and 204, respectively) is described as being performed at the beginning of the method 400, one of skill in the art in possession of the present disclosure will appreciate that at least a portion of block 402 may be performed at different times. For example, the configuration of the powering device connector 308a to receive power (i.e., the power negotiation for the powering device connector 308a with the powering device 204) later in the method 400 (e.g., following power being unavailable from the powering device connector 306a) while remaining within the scope of the present disclosure as well.

Figure 7B:
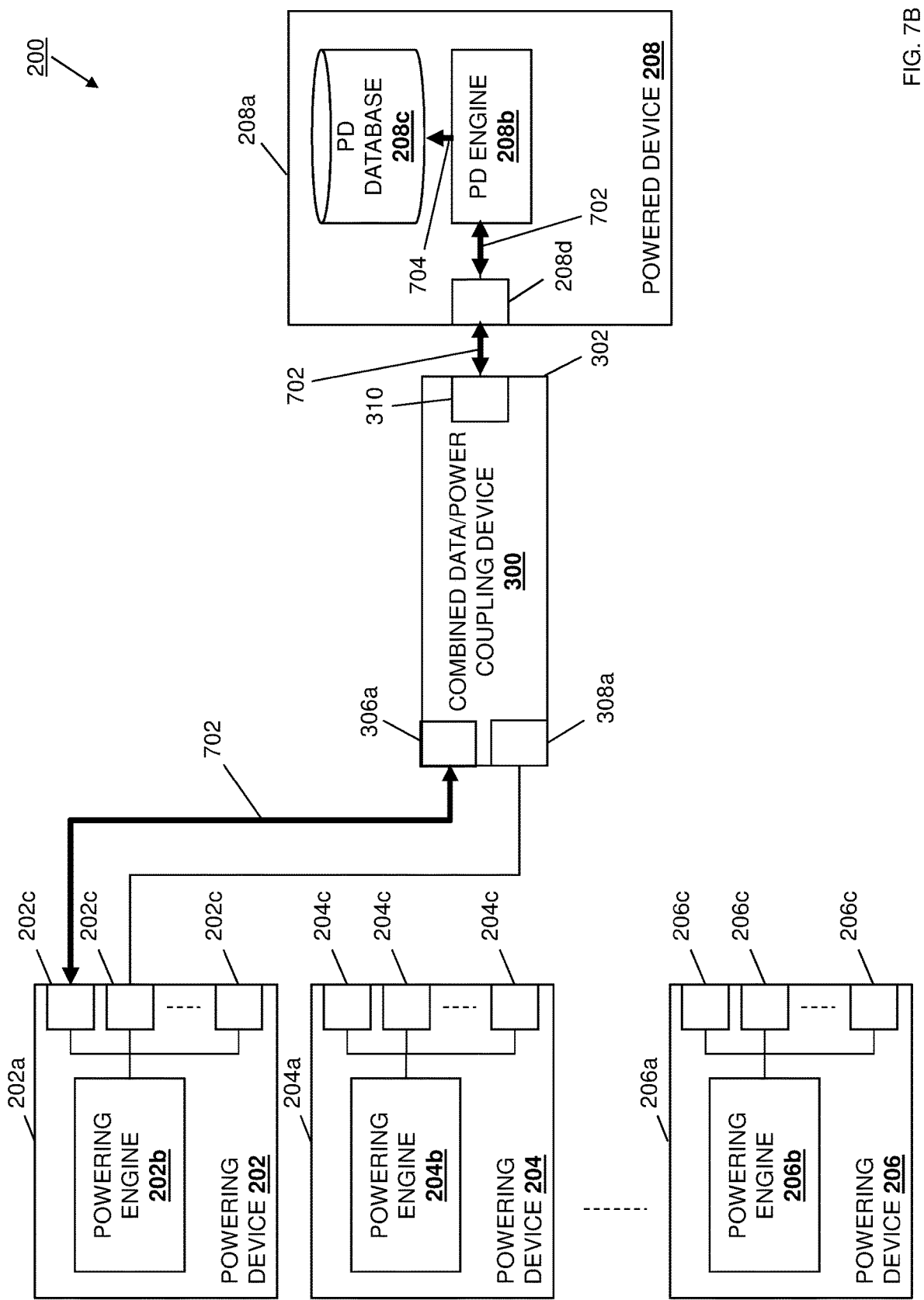
FIG. 7B is a schematic view illustrating an embodiment of the high availability combined data/power coupling device in the networked system of FIG. 5 operating during the method of FIG. 4.

The method 400 then proceeds to block 404 where the combined data/power coupling device configures the first powering device connector to receive data from a powering device. With reference to FIG. 7B, in an embodiment of block 404, the data/power coupling engine 304 in the combined data/power coupling device 300 may perform powering device connector data configuration operations 702 that include communicating with the powered device engine 208d via the powered device connector 310 and the port 208d on the powered device 208, and communicating with the powering engine 202b via the powering device connector 306a and the port 202c on the powering device 202, in order to configure the powering device 202 and the powered device 208 to exchange data via their ports 202c and 208d, respectively, as well as the powering device connector 306a and powered device connector 310 on the combined data/power coupling device 300.

As such, one of skill in the art in possession of the present disclosure will appreciate how the powering device connector data configuration operations 702 may include any of a variety of communications that operate to allow the powering device 202 to transmit data destined for the powered device 208 (along with power) via its port 202c to the powering device connector 306a on the combined data/power coupling device 300. Furthermore, as illustrated in FIG. 7B, the powering device connector data configuration operations 702 may result in the powered device engine 208b performing data table configuration operation 704 that may include programming its Media Access Control (MAC) tables with information received as part of the powering device connector data configuration operations 702. However, while particular data table configuration operations are described, one of skill in the art in possession of the present disclosure will recognize that the powering device 202 and/or powered device 208 may be configured in a variety of manners to configure the powering device connector 306a to receive data destined for the powered device 208 from the powering device 202.

Figure 8B:
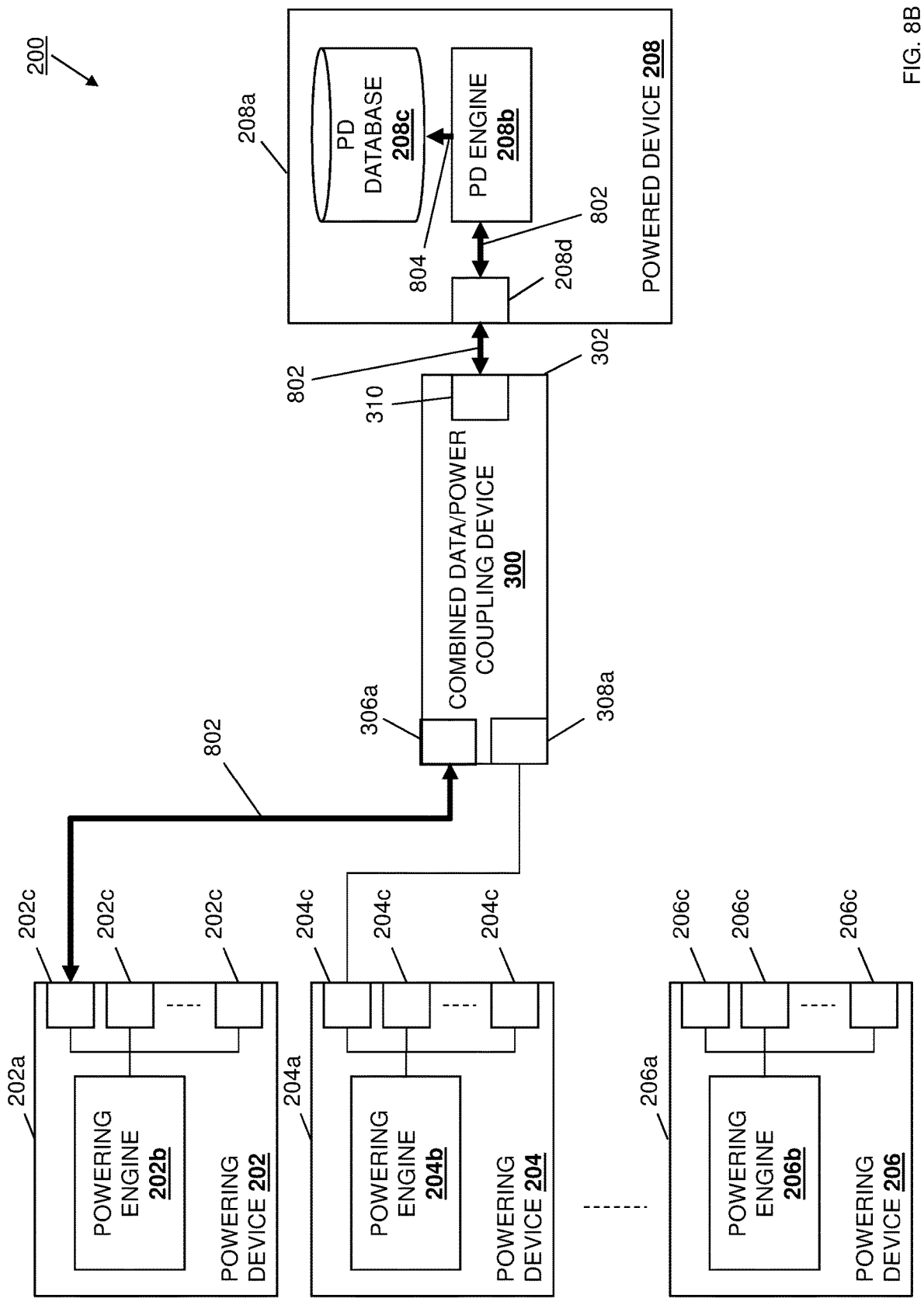
FIG. 8B is a schematic view illustrating an embodiment of the high availability combined data/power coupling device in the networked system of FIG. 6 operating during the method of FIG. 4.

With reference to FIG. 8B, in an embodiment of block 404, the data/power coupling engine 304 in the combined data/power coupling device 300 may perform powering device connector data configuration operations 802 that include communicating with the powered device engine 208d via the powered device connector 310 and the port 208d on the powered device 208, and communicating with the powering engine 202b via the powering device connector 306a and the port 202c on the powering device 202, in order to configure the powering device 202 and the powered device 208 to exchange data via their ports 202c and 208d, respectively, and the powering device connector 306a and powered device connector 310 on the combined data/power coupling device 300.

As such, one of skill in the art in possession of the present disclosure will appreciate how the powering device connector data configuration operations 802 may include any of a variety of communications that operate to allow the powering device 202 to transmit data destined for the powered device 208 (along with power) via its port 202c to the powering device connector 306a on the combined data/power coupling device 300. Furthermore, as illustrated in FIG. 8B, the powering device connector data configuration operations 802 may result in the powered device engine 208b performing data table configuration operation 804 that may include programming its MAC tables with information received as part of the powering device connector data configuration operations 802. However, while particular data table configuration operations are described, one of skill in the art in possession of the present disclosure will recognize that the powering device 202 and/or powered device 208 may be configured in a variety of manners to configure the powering device connector 306a to receive data destined for the powered device 208 from the powering device 202.

Figure 7C:
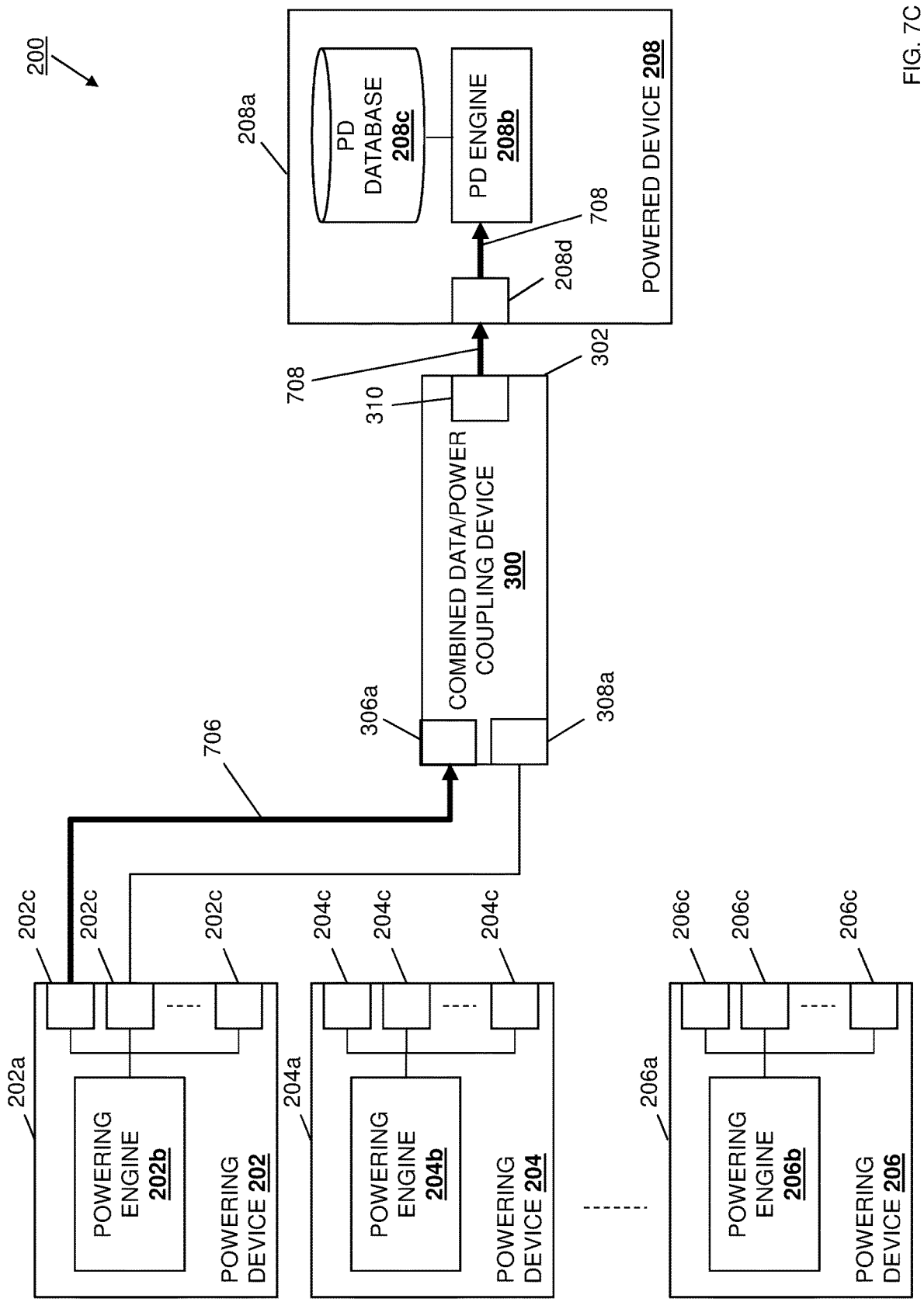
FIG. 7C is a schematic view illustrating an embodiment of the high availability combined data/power coupling device in the networked system of FIG. 5 operating during the method of FIG. 4.

The method 400 then proceeds to block 406 where the combined data/power coupling device provides power and data received from the powering device via the first power connector to a powered device via a powered device connector. With reference to FIG. 7C, in an embodiment of block 406, the data/power coupling engine 304 in the combined data/power coupling device 300 may perform data/power receiving operations 706 that include receiving data and power transmitted by the powering device 202 through the port 202c via its powering device connector 306a, as well as data/power provisioning operations 708 that include transmitted that data and power via its powered device connector 310 and through the port 208d to the powered device engine 208b in the powered device 208. As will be appreciated by one of skill in the art in possession of the present disclosure, any power received at past of the data/power receiving operations 706 may be utilized to power the combined data/power coupling device 300, as well as charge the power subsystem 312 in the combined data/power coupling device 300.

The powered device engine 208b may then utilize power received from the combined data/power coupling device 300 to power any of the components in the powered device, and may utilize data received from the combined data/power coupling device 300 in any of a variety of manners known in the art. While not illustrated or described in detail herein, one of skill in the art in possession of the present disclosure will recognize how the powered device engine 208b in the powered device 208 may also generate and/or transmit data via its port 208d and to the combined data/power coupling device 300 via the powered device connector 310, and the data/power coupling engine 304 in the combined data/power coupling device 300 will transmit that data via its powering device connector 306a and to the powering device 202 via its port 202c. As such, at block 406 the powering device 202 and the powered device 208 may exchange data while the powered device 208 is powered via power supplied by the powering device 202.

Figure 8C:
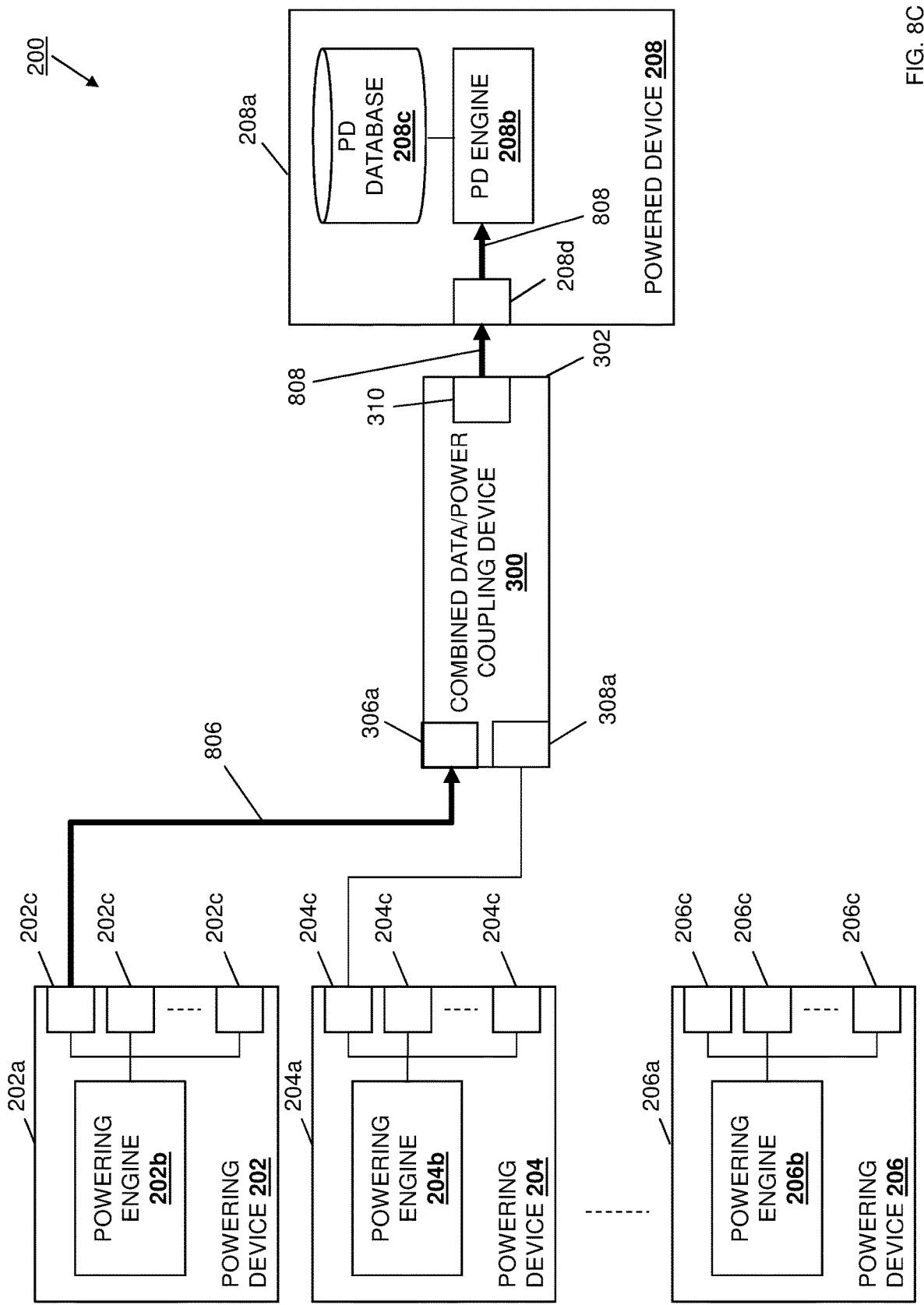
FIG. 8C is a schematic view illustrating an embodiment of the high availability combined data/power coupling device in the networked system of FIG. 6 operating during the method of FIG. 4.

With reference to FIG. 8C, in an embodiment of block 406, the data/power coupling engine 304 in the combined data/power coupling device 300 may perform data/power receiving operations 806 that include receiving data and power transmitted by the powering device 202 through the port 202c via its powering device connector 306a, as well as data/power provisioning operations 708 that include transmitted that data and power via its powered device connector 310 and through the port 208d to the powered device engine 208b in the powered device 208. As will be appreciated by one of skill in the art in possession of the present disclosure, any power received at past of the data/power receiving operations 806 may be utilized to power the combined data/power coupling device 300, as well as charge the power subsystem 312 in the combined data/power coupling device 300.

The powered device engine 208b may then utilize the power received from the combined data/power coupling device 300 to power any of the components in the powered device, and may utilize that data received from the combined data/power coupling device 300 in any of a variety of manners known in the art. While not illustrated or described in detail herein, one of skill in the art in possession of the present disclosure will recognize how the powered device engine 208b in the powered device 208 may also generate and/or transmit data via its port 208d and to the combined data/power coupling device 300 via the powered device connector 310, and the data/power coupling engine 304 in the combined data/power coupling device 300 will transmit that data via its powering device connector 306a and to the powering device 202 via its port 202c. As such, at block 406 the powering device 202 and the powered device 208 may exchange data while the powered device 208 is powered via power supplied by the powering device 202.

The method 400 then proceeds to decision block 408 where it is determined whether data and power are available via the first powering device connector. In an embodiment, at decision block 408, the power sensor subsystem 306b may monitor the powering device connector 306a in the combined data/power coupling device 300 to determine whether data and power are available via that powering device connector 306a. However, while the powering device connector 306a is described as operating as a "primary/active" data/power connector that has its data/power availability monitored by its power sensor subsystem 306b at decision block 408, and the powering device connector 308a is described as operating as a "secondary/inactive" data/power connector that does not have its data/power availability monitored by its power sensor subsystem 308b at decision block 408 in this example, one of skill in the art in possession of the present disclosure will appreciate that the powering device connector 308a is may have its data/power availability monitored by its power sensor subsystem 308b at decision block 408 when it operates as a "primary/active" data/power connector to supply data and power to the powered device 208.

If, at decision block 408, it is determined that data and power are available via the first powering device connector, the method 400 returns to block 406. As such, in the event the power sensor subsystem 306b determines that data and power are being received by the powering device connector 306a in the combined data/power coupling device 300, the method 400 may loop such that that data and power continue to be received by the powering device connector 306a and provided to the powered device 208 as discussed above with reference to block 406, while the power sensor subsystem 306b continues to monitor the powering device connector 306a in the combined data/power coupling device 300 to determine whether data and power are available via that powering device connector 306a.

Figure 7D:
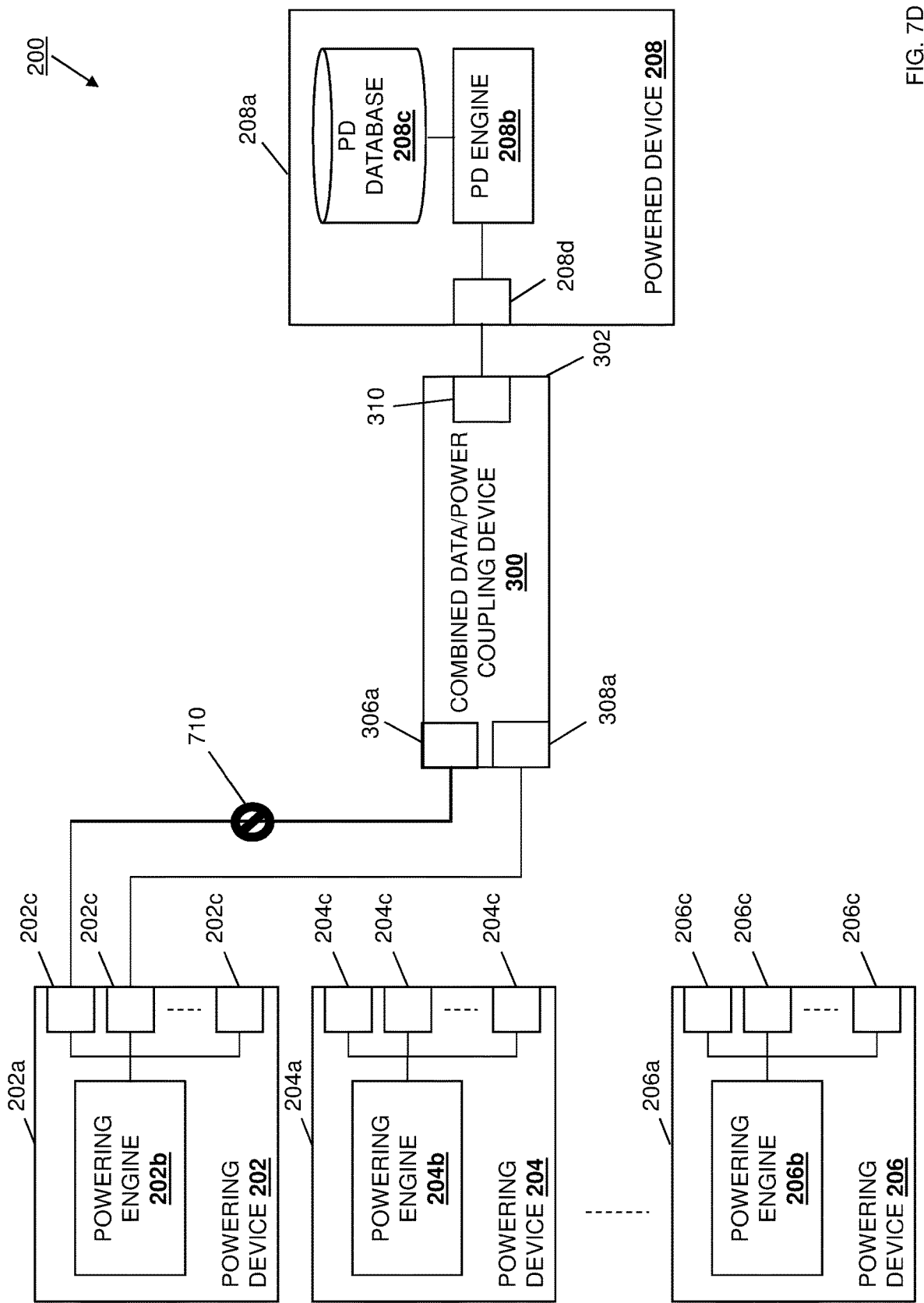
FIG. 7D is a schematic view illustrating an embodiment of the high availability combined data/power coupling device in the networked system of FIG. 5 operating during the method of FIG. 4.

If at decision block 408, it is determined that data and power are not available via the first powering device connector, the method 400 proceeds to block 410 where the combined data/power coupling device configures the second powering device connector to receive data from a powering device. With reference to FIG. 7D, in an embodiment of decision block 408, the power sensor subsystem 306b may determine that data and power are no longer being received by the powering device connector 306a in the combined data/power coupling device 300 (as indicated by element 710 in FIG. 7D) and, in response, may alert the data/power coupling engine 304 in the combined data/power coupling device 300 that data and power are no longer being received by the powering device connector 306a. For example, the unavailability of data and power at the powering device connector 306a may be due to an unavailability of the cable connected to it (e.g., the cable has become unplugged or damaged), an unavailability of the port 202c on the powering device 202 to which it is connected (a port misconfiguration or other port failure), an unavailability of the powering device 202 (a loss of power to the powering device 202, a software/hardware failure in the powering device 202, maintenance operations being performed on the powering device 202, etc.), due to the powering device 202 not powering the port 202c connected to it based on power resources and a priority of that port 202c, and/or due to any other reason that would be apparent to one of skill in the art in possession of the present disclosure.

As will be appreciated by one of skill in the art in possession of the present disclosure, in the event of a loss of power at the powering device connector 306a, the power subsystem 312 (e.g., charged capacitors) may be utilized to power the combined data/power coupling device 300 until power is restored (e.g., by receiving that power along with data at the powering device connector 308a as discussed below). However, while a particular power subsystem 312 is described, one of skill in the art in possession of the present disclosure will appreciate how the combined data/power coupling device 300 may operate using other power sources until power is restored while remaining within the scope of the present disclosure as well.

Figure 7E:
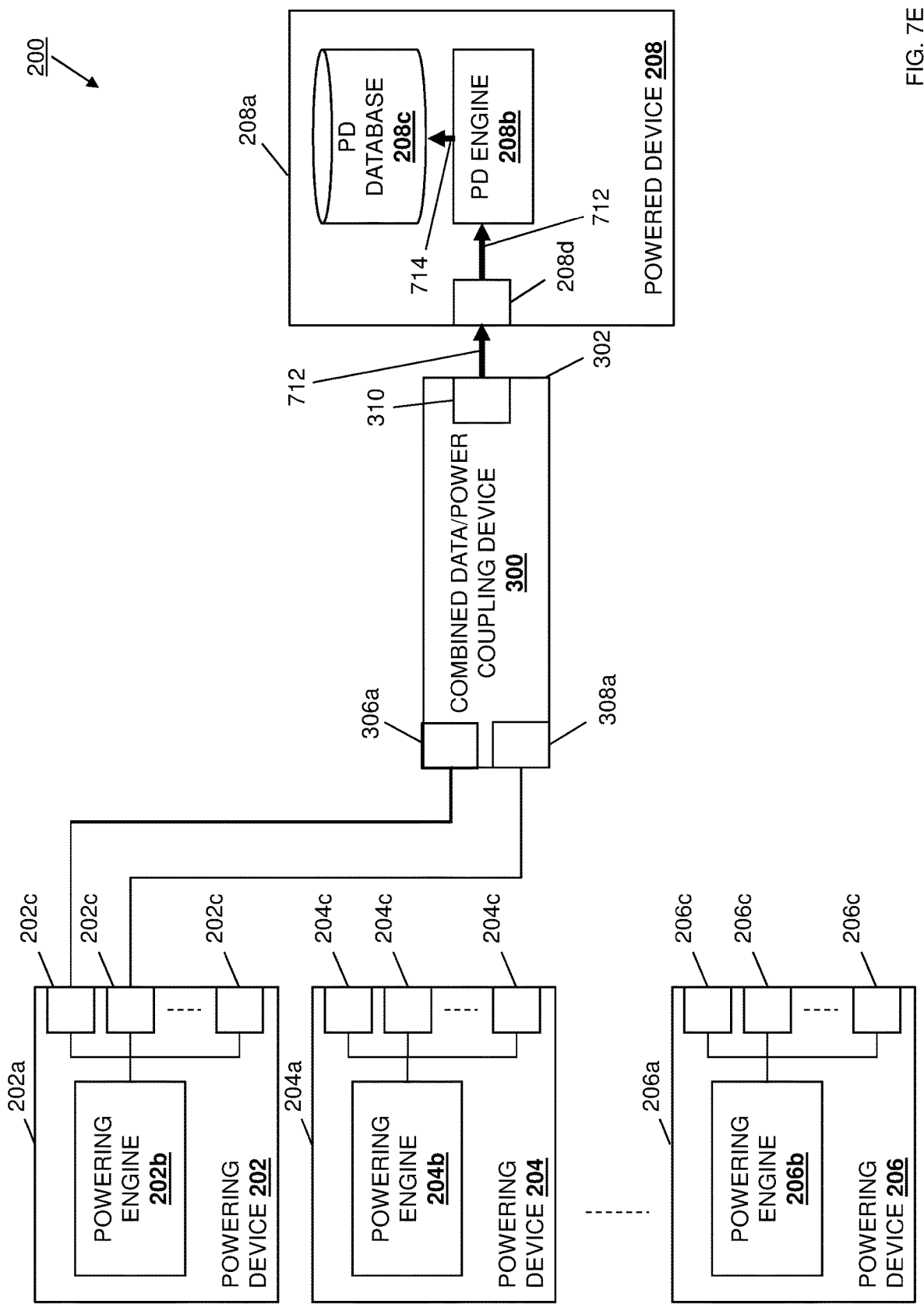
FIG. 7E is a schematic view illustrating an embodiment of the high availability combined data/power coupling device in the networked system of FIG. 5 operating during the method of FIG. 4.

With reference to FIG. 7E, in response to being alerted that data and power are no longer being received by the powering device connector 306a, at block 410 the data/power coupling engine 304 in the combined data/power coupling device 300 may perform data table preparation operations 712 that include transmitting an instruction via the powered device connector 310 and through the port 208d on the powered device 208 and to the powered device engine 208b to erase data tables (e.g., the MAC tables discussed above), which may cause the powered device engine 208b to perform table erase operations 714 to erase the data tables in it powered device database 208c.

Figure 7F:
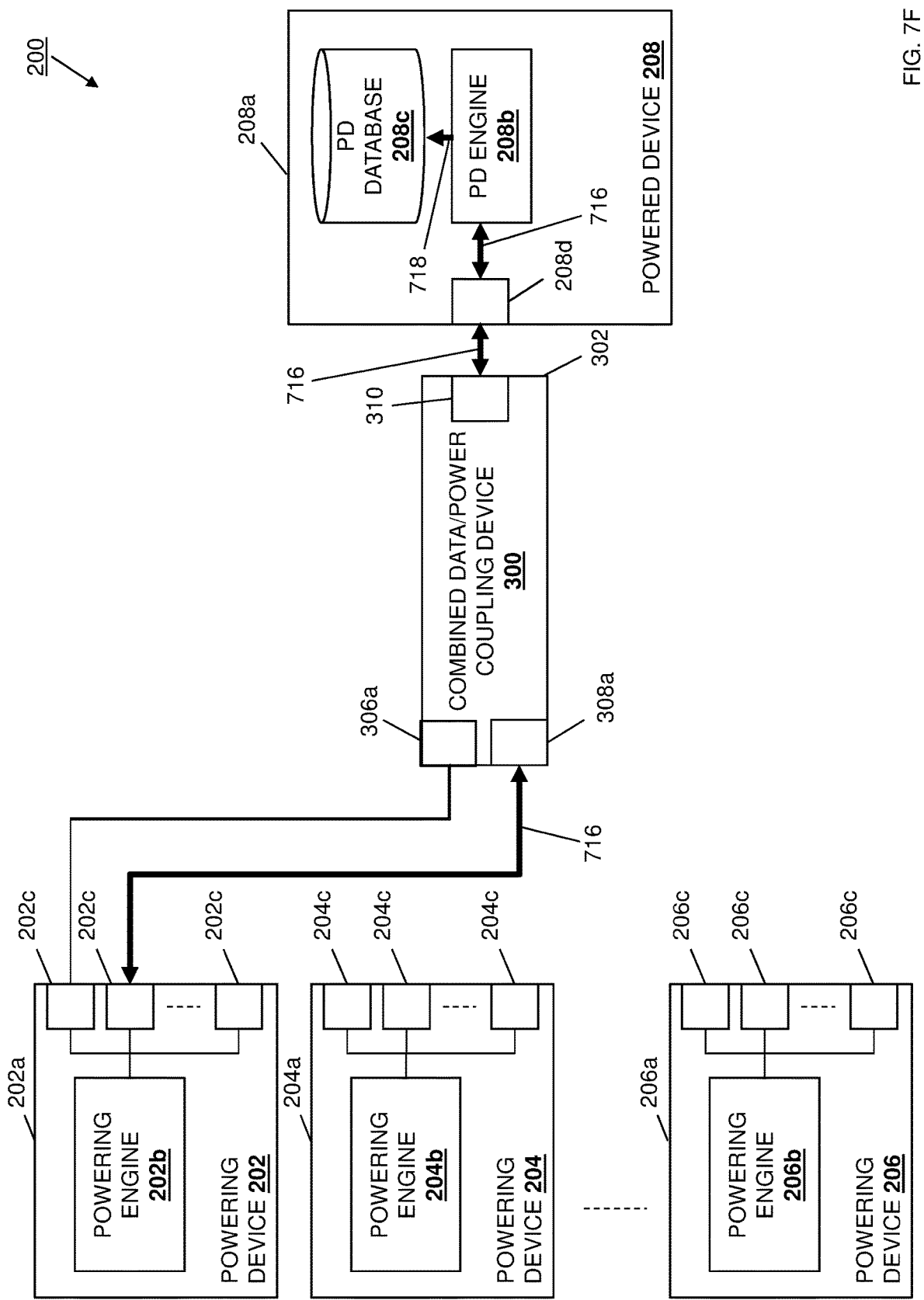
FIG. 7F is a schematic view illustrating an embodiment of the high availability combined data/power coupling device in the networked system of FIG. 5 operating during the method of FIG. 4.

With reference to FIG. 7F, in an embodiment of block 410, the data/power coupling engine 304 in the combined data/power coupling device 300 may then perform powering device connector data configuration operations 716 that include communicating with the powered device engine 208d via the powered device connector 310 and the port 208d on the powered device 208, and communicating with the powering engine 202b via the powering device connector 308a and the port 202c on the powering device 202 to which it is coupled, in order to configure the powering device 202 and the powered device 208 to exchange data via their ports 202c and 208d, respectively, as well as the powering device connector 308a and powered device connector 310 on the combined data/power coupling device 300.

As such, one of skill in the art in possession of the present disclosure will appreciate how the powering device connector data configuration operations 716 may include any of a variety of communications that operate to allow the powering device 202 to transmit data destined for the powered device 208 (along with power) via its port 202c to the powering device connector 308a on the combined data/power coupling device 300. Furthermore, as illustrated in FIG. 7F, the powering device connector data configuration operations 716 may result in the powered device engine 208b performing data table configuration operation 718 that may include programming its MAC tables with information received as part of the powering device connector data configuration operations 716. However, while particular data table configuration operations are described, one of skill in the art in possession of the present disclosure will recognize that the powering device 202 and/or powered device 208 may be configured in a variety of manners to configure the powering device connector 308a to receive data destined for the powered device 208 from the powering device 202.

Figure 8D:
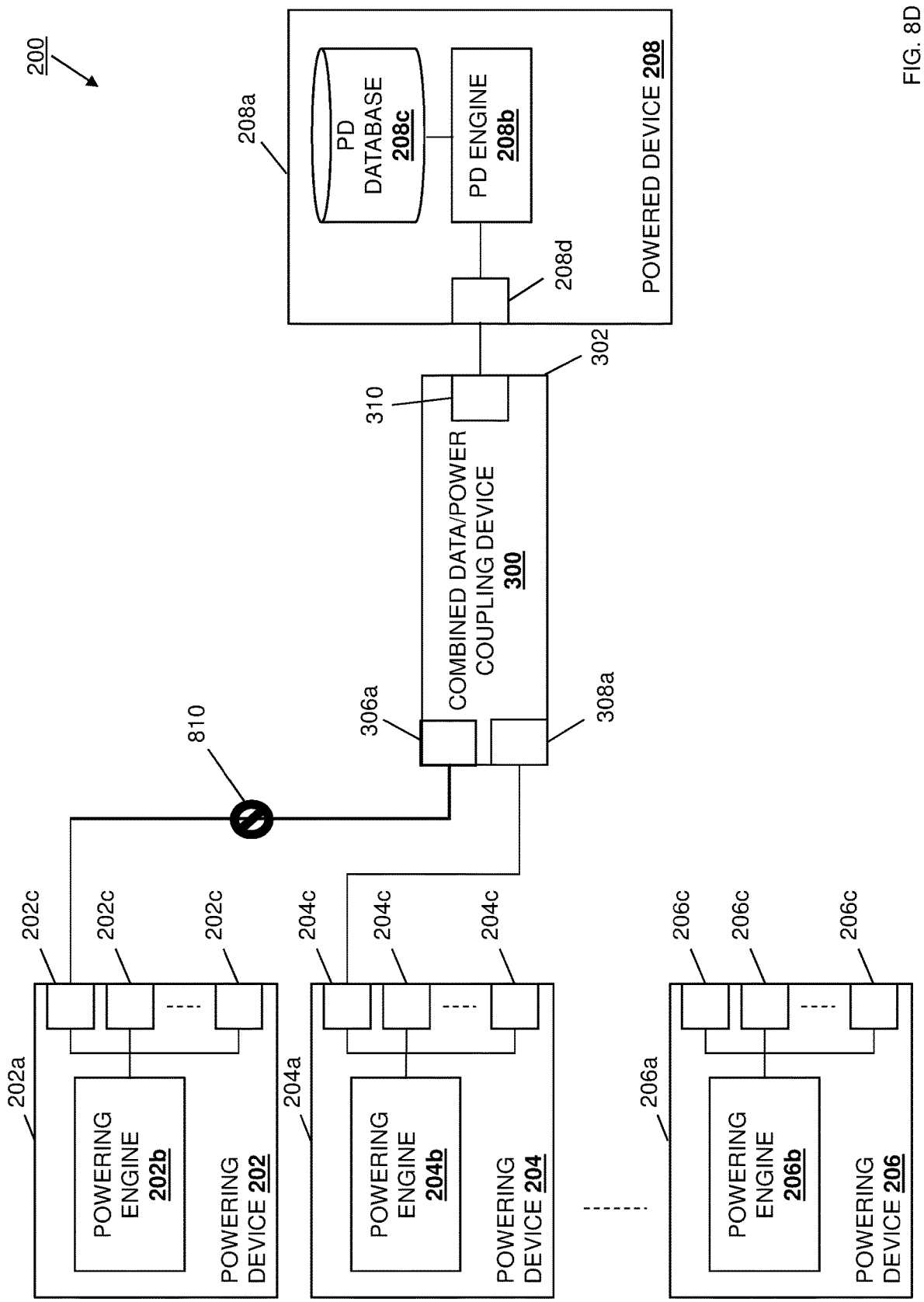
FIG. 8D is a schematic view illustrating an embodiment of the high availability combined data/power coupling device in the networked system of FIG. 6 operating during the method of FIG. 4.

With reference to FIG. 8D, in an embodiment of block 408, the power sensor subsystem 308b may determine that data and power are no longer being received by the powering device connector 306a in the combined data/power coupling device 300 (as indicated by element 810 in FIG. 8D) and, in response, may alert the data/power coupling engine 304 in the combined data/power coupling device 300 that data and power are no longer being received by the powering device connector 306a. For example, the unavailability of data and power at the powering device connector 306a may be due to an unavailability of the cable connected to it (e.g., the cable has become unplugged or damaged), an unavailability of the port 202c on the powering device 202 to which it is connected (a port misconfiguration or other port failure), an unavailability of the powering device 202 (a loss of power to the powering device 202, a software/hardware failure in the powering device 202, maintenance operations being performed on the powering device 202, etc.), due to the powering device 202 not powering the port 202c connected to it based on power resources and a priority of that port 202c, and/or due to any other reason that would be apparent to one of skill in the art in possession of the present disclosure.

As will be appreciated by one of skill in the art in possession of the present disclosure, in the event of a loss of power at the powering device connector 306a, the power subsystem 312 (e.g., charged capacitors) may be utilized to power the combined data/power coupling device 300 until power is restored (e.g., by receiving that power along with data at the powering device connector 308a as discussed below). However, while a particular power subsystem 312 is described, one of skill in the art in possession of the present disclosure will appreciate how the combined data/power coupling device 300 may operate using other power sources until power is restored while remaining within the scope of the present disclosure as well.

Figure 8E:
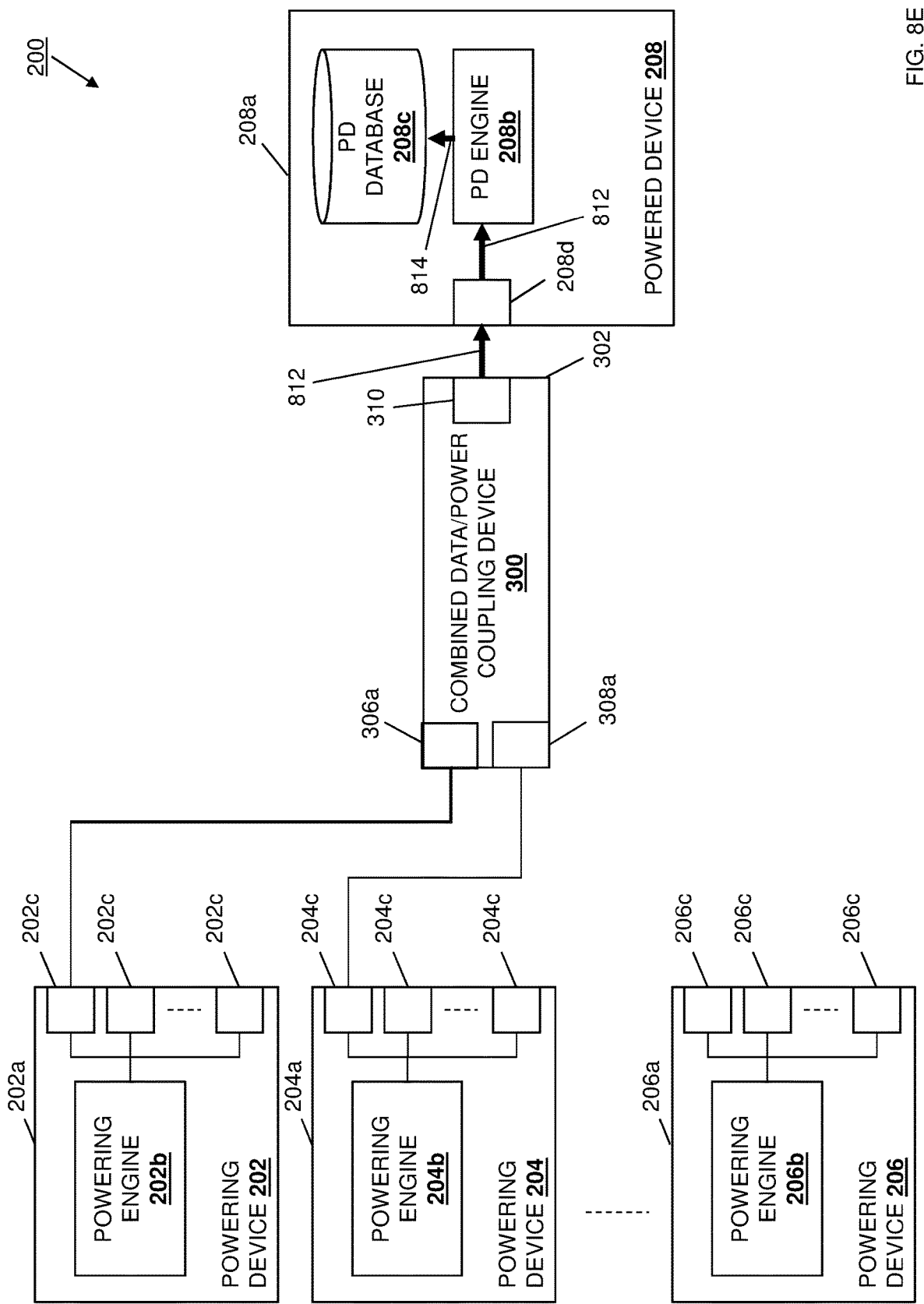
FIG. 8E is a schematic view illustrating an embodiment of the high availability combined data/power coupling device in the networked system of FIG. 6 operating during the method of FIG. 4.

With reference to FIG. 8E, in response to being alerted that data and power are no longer being received by the powering device connector 306a, at block 410 the data/power coupling engine 304 in the combined data/power coupling device 300 may perform data table preparation operations 812 that include transmitting an instruction via the powered device connector 310 and through the port 208d on the powered device 208 and to the powered device engine 208b to erase data tables (e.g., the MAC tables discussed above), which may cause the powered device engine 208b to perform table erase operations 814 to erase the data tables in it powered device database 208c.

Figure 8F:
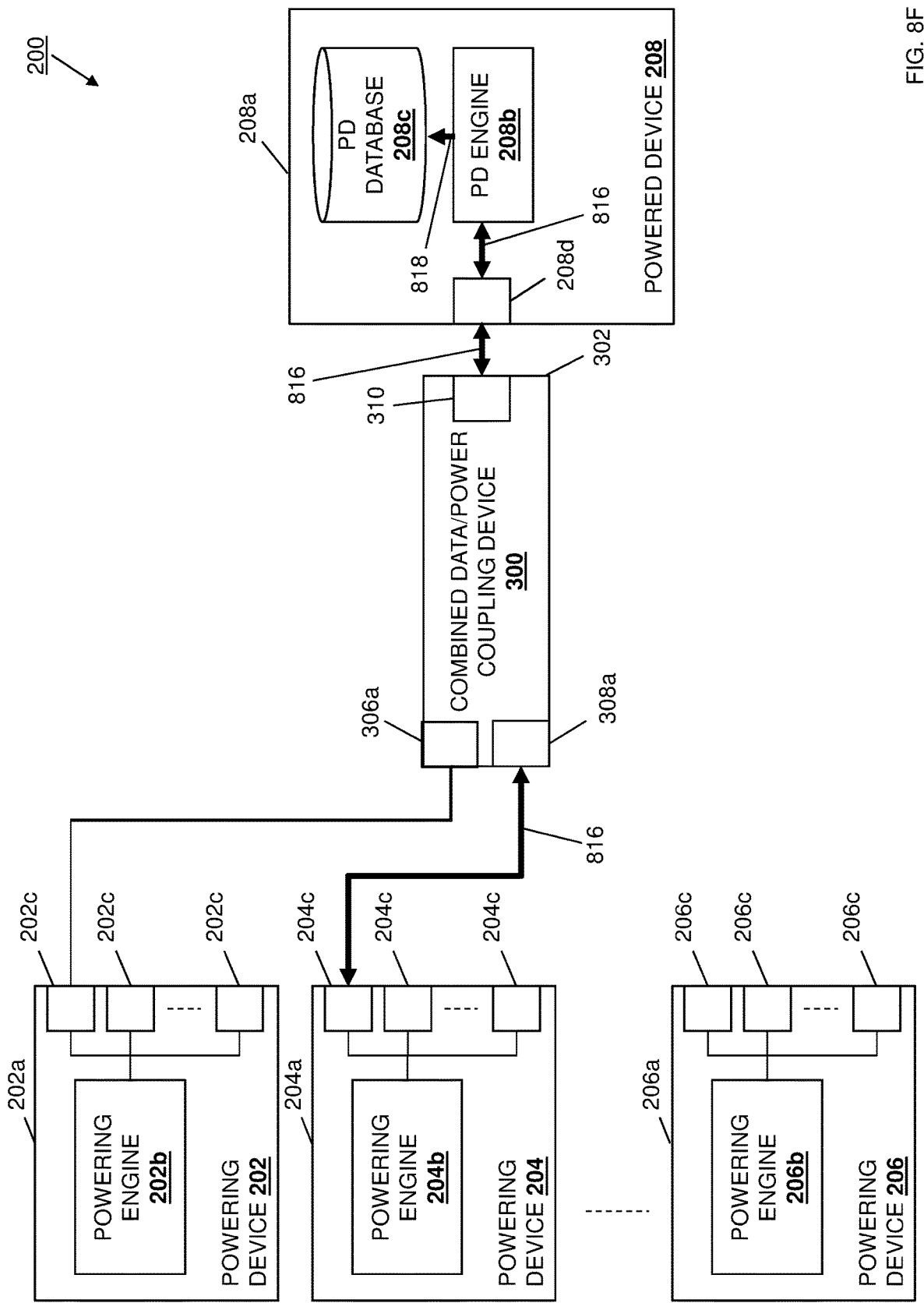
FIG. 8F is a schematic view illustrating an embodiment of the high availability combined data/power coupling device in the networked system of FIG. 6 operating during the method of FIG. 4.

With reference to FIG. 8F, in an embodiment of block 410, the data/power coupling engine 304 in the combined data/power coupling device 300 may then perform powering device connector data configuration operations 816 that include communicating with the powered device engine 208d via the powered device connector 310 and the port 208d on the powered device 208, and communicating with the powering engine 204b via the powering device connector 308a and the port 204c on the powering device 204 to which it is coupled, in order to configure the powering device 204 and the powered device 208 to exchange data via their ports 204c and 208d, respectively, as well as the powering device connector 308a and powered device connector 310 on the combined data/power coupling device 300.

As such, one of skill in the art in possession of the present disclosure will appreciate how the powering device connector data configuration operations 816 may include any of a variety of communications that operate to allow the powering device 204 to transmit data destined for the powered device 208 (along with power) via its port 204c to the powering device connector 308a on the combined data/power coupling device 300. Furthermore, as illustrated in FIG. 8F, the powering device connector data configuration operations 816 may result in the powered device engine 208b performing data table configuration operation 818 that may include programming its MAC tables with information received as part of the powering device connector data configuration operations 816. However, while particular data table configuration operations are described, one of skill in the art in possession of the present disclosure will recognize that the powering device 204 and/or powered device 208 may be configured in a variety of manners to configure the powering device connector 308a to receive data destined for the powered device 208 from the powering device 204.

The method 400 then proceeds to block 412 where the combined data/power coupling device provides power and data received from the powering device via the second power connector to the powered device via the powered device connector. With reference to FIG. 7G, in an embodiment of block 412, the data/power coupling engine 304 in the combined data/power coupling device 300 may perform data/power receiving operations 720 that include receiving data and power transmitted by the powering device 202 through the port 202c via its powering device connector 308a, as well as data/power provisioning operations 722 that include transmitted that data and power via its powered device connector 310 and through the port 208d to the powered device engine 208b in the powered device 208. As will be appreciated by one of skill in the art in possession of the present disclosure, the powered device engine 208b may then utilize that power to power any of the components in the powered device, and may utilize that data in any of a variety of manners known in the art. Furthermore, any of the power received as part of the data/power receiving operations 720 may be used to charge the power subsystem 312, which may have had its charge depleted during the switchover from receiving power via the powering device connector 306a to receiving power via the powering device connector 308a.

While not illustrated or described in detail herein, one of skill in the art in possession of the present disclosure will recognize how the powered device engine 208b in the powered device 208 may also generate and/or transmit data via its port 208d and to the combined data/power coupling device 300 via the powered device connector 310, and the data/power coupling engine 304 in the combined data/power coupling device 300 will transmit that data via its powering device connector 308a and to the powering device 202 via its port 202c. As such, at block 412 the powering device 202 and the powered device 208 may exchange data while the powered device 208 is powered via power supplied by the powering device 204. Thus, the combined data/power coupling device 300 may provide port-level redundancy for combined data/power transmissions to the powered device 208 such that if one of the ports 202c on the powering device 202 fails, another of the ports 202c on the powering device 202 provides data and power to that powered device 208.

With reference to FIG. 8G, in an embodiment of block 412, the data/power coupling engine 304 in the combined data/power coupling device 300 may perform data/power receiving operations 820 that include receiving data and power transmitted by the powering device 204 through the port 204c via its powering device connector 308a, as well as data/power provisioning operations 822 that include transmitted that data and power via its powered device connector 310 and through the port 208d to the powered device engine 208b in the powered device 208. As will be appreciated by one of skill in the art in possession of the present disclosure, the powered device engine 208b may then utilize that power to power any of the components in the powered device, and may utilize that data in any of a variety of manners known in the art. Furthermore, any of the power received as part of the data/power receiving operations 820 may be used to charge the power subsystem 312, which may have had its charge depleted during the switchover from receiving power via the powering device connector 306a to receiving power via the powering device connector 308a.

While not illustrated or described in detail herein, one of skill in the art in possession of the present disclosure will recognize how the powered device engine 208b in the powered device 208 may also generate and/or transmit data via its port 208d and to the combined data/power coupling device 300 via the powered device connector 310, and the data/power coupling engine 304 in the combined data/power coupling device 300 will transmit that data via its powering device connector 308a and to the powering device 204 via its port 204c. As such, at block 412 the powering device 204 and the powered device 208 may exchange data while the powered device 208 is powered via power supplied by the powering device 204. Thus, the combined data/power coupling device 300 may provide powering-device-level redundancy for combined data/power transmissions to the powered device 208 such that if the powering device 202 fails, the powering device 204 may provide data and power to that powered device 208.

Thus, systems and methods have been described that provide PoE port-level or PoE switch-device-level redundancy by connecting to multiple PoE switch ports (on the same PoE switch or different PoE switches), providing data and power from a first of those PoE switch ports to a powered device port, and then performing an uninterrupted switchover to provide data and power from a second of those PoE switch ports to the powered device port in the event the power is not available from the first of those PoE switch ports. For example, the combined data/power coupling device of the present disclosure may include a chassis having first and second PoE switch connectors and a powered device connector each coupled to a data/power coupling subsystem. The data/power coupling subsystem configures each of the first and second PoE switch connectors to receive power from at least one PoE switch, configures the first PoE switch connector to receive data from the at least one PoE switch, and provides data and power received via the first PoE switch connector to a powered device via the PoE switch connector. When the data/power coupling subsystem determines that data and power are not available via the first PoE switch connector, it configures the second PoE switch connector to receive data from the at least one PoE switch, and provides data and power received via the second PoE switch connector to the powered device via the powered device connector. As such, if a cable becomes unplugged or damaged, a PoE switch port "goes down" due to misconfiguration, a PoE switch loses power or is brought down for maintenance, a PoE switch stops powering a port when power resources are relatively low and the port has relatively low priority, the powered device will still receive data and power, thus preventing loss of real-time and historical data.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A combined data/power coupling device, comprising:
a chassis;
a first powering device connector that is included on the chassis;
a second powering device connector that is included on the chassis;
a powered device connector that is included on the chassis; and
a data/power coupling subsystem coupled to the first powering device connector, the second powering device connector, and the powered device connector, wherein the data/power coupling subsystem is configured to:
configure each of the first powering device connector and the second powering device connector to receive power from at least one powering device;
configure the first powering device connector to receive data from the at least one powering device;
provide data and power received from the at least one powering device via the first powering device connector to a powered device via the powered device connector;
determine that data and power are not available via the first powering device connector;
configure the second powering device connector to receive data from the at least one powering device;
provide data and power received from the at least one powering device via the second powering device connector to the powered device via the powered device connector; and
a power subsystem that is included in the chassis and that is configured to supply power to the data/power coupling subsystem between a first time when power is not available via the first powering device connector and a second time when power is received from the at least one powering device via the second powering device connector.

2. The device of claim 1, further comprising:
a first power sensor subsystem that is coupled to the first powering device connector and the data/power coupling subsystem, wherein the first power sensor subsystem is configured to report to the data/power coupling subsystem that data and power are not available via the first powering device connector.

3. The device of claim 1, wherein
the power subsystem includes at least one capacitor.

4. The device of claim 1, wherein the first powering device connector is connected to a first port on a powering device and the data and power received via the first powering device connector is received via the first port, and wherein the second powering device connector is connected to a second port on the powering device and the data and power received via the second powering device connector is received via that second port.

5. The device of claim 1, wherein the first powering device connector is connected to a first port on a first powering device and the data and power received via the first powering device connector is received via the first port, and wherein the second powering device connector is connected to a second port on a second powering device and the data and power received via the second powering device connector is received via the second port.

6. The system of claim 1, wherein the configuring the second powering device connector to receive data from the at least one powering device includes:
causing the powered device to clear first information from a powered device database that configures the first powering device connector to receive data from the at least one powering device; and
causing the powered device to communicate with the at least one powering device to provide second information in the powered device database that configures the second powering device connector to receive data from the at least one powering device.

7. An Information Handling System (IHS), comprising:
at least one powering device;
a powered device; and
a combined data/power coupling device including a first powering device connector and a second powering device connector that are each coupled to the at least one powering device, and a powered device connector coupled to the powered device, wherein the combined data/power coupling device is configured to:
configure each of the first powering device connector and the second powering device connector to receive power from the at least one powering device;
configure the first powering device connector to receive data from the at least one powering device;
provide data and power received from the at least one powering device via the first powering device connector to the powered device via the powered device connector;
determine that data and power are not available via the first powering device connector;
configure the second powering device connector to receive data from the at least one powering device;
provide data and power received from the at least one powering device via the second powering device connector to the powered device via the powered device connector; and
a power subsystem that is included in the combined data/power coupling device and that is configured to supply power to the combined data/power coupling device between a first time when power is not available via the first powering device connector and a second time when power is received from the at least one powering device via the second powering device connector.

8. The IHS of claim 7, wherein the combined data/power coupling device includes:
a first power sensor subsystem that is coupled to the first powering device connector, wherein the first power sensor subsystem is configured to report to the combined data/power coupling device that data and power are not available via the first powering device connector.

9. The IHS of claim 7, wherein the
power subsystem includes at least one capacitor.

10. The IHS of claim 7, wherein the first powering device connector is connected to a first port on a powering device and the data and power received via the first powering device connector is received via the first port, and wherein the second powering device connector is connected to a second port on the powering device and the data and power received via the second powering device connector is received via the second port.

11. The IHS of claim 7, wherein the first powering device connector is connected to a first port on a first powering device and the data and power received via the first powering device connector is received via the first port, and wherein the second powering device connector is connected to a second port on a second powering device and the data and power received via the second powering device connector is received via the second port.

12. The IHS of claim 7, wherein the configuring the second powering device connector to receive data from the at least one powering device includes:
causing the powered device to clear first information from a powered device database that configures the first powering device connector to receive data from the at least one powering device; and
causing the powered device to communicate with the at least one powering device to provide second information in the powered device database that configures the second powering device connector to receive data from the at least one powering device.

13. The IHS of claim 7, wherein the first powering device connector is coupled to the at least one powering device via a first cable, the second powering device connector is coupled to the at least one powering device via a second cable, and the powered device connector is coupled to the powered device via a third cable.

14. A method for providing combined data/power to a powered device, comprising:
configuring, by a combined data/power coupling device, each of a first powering device connector and a second powering device connector on the combined data/power coupling device to receive power from at least one powering device coupled to the first powering device connector and the second powering device connector;
configuring, by the combined data/power coupling device, the first powering device connector to receive data from the at least one powering device;
providing, by the combined data/power coupling device, data and power received from the at least one powering device via the first powering device connector to a powered device via a powered device connector on the combined data/power coupling device that is coupled to the powered device;
determining, by the combined data/power coupling device, that data and power are not available via the first powering device connector;
configuring, by the combined data/power coupling device, the second powering device connector to receive data from the at least one powering device; and
providing, by the combined data/power coupling device, data and power received from the at least one powering device via the second powering device connector to the powered device via the powered device connector;
supplying, by a power subsystem that is included in the combined data/power coupling device, power to the combined data/power coupling device between a first time when power is not available via the first powering device connector and a second time when power is received from the at least one powering device via the second powering device connector.

15. The method of claim 14, further comprising:
reporting, by a first power sensor subsystem that is included in the combined data/power coupling device and coupled to the first powering device connector, to the combined data/power coupling device that data and power are not available via the first powering device connector.

16. The method of claim 14, wherein the power subsystem includes at least one capacitor.

17. The method of claim 14, wherein the first powering device connector is connected to a first port on a powering device and the data and power received via the first powering device connector is received via the first port, and wherein the second powering device connector is connected to a second port on the powering device and the data and power received via the second powering device connector is received via the second port.

18. The method of claim 14, wherein the first powering device connector is connected to a first port on a first powering device and the data and power received via the first powering device connector is received via the first port, and wherein the second powering device connector is connected to a second port on a second powering device and the data and power received via the second powering device connector is received via the second port.

19. The method of claim 14, wherein the configuring the second powering device connector to receive data from the at least one powering device includes:
causing, by the combined data/power coupling device, the powered device to clear first information from a powered device database that configures the first powering device connector to receive data from the at least one powering device; and
causing, by the combined data/power coupling device, the powered device to communicate with the at least one powering device to provide second information in the powered device database that configures the second powering device connector to receive data from the at least one powering device.

20. The method of claim 14, wherein the first powering device connector is coupled to the at least one powering device via a first cable, the second powering device connector is coupled to the at least one powering device via a second cable, and the powered device connector is coupled to the powered device via a third cable.

* * * * *